(12) United States Patent
Long et al.

(10) Patent No.: US 9,176,902 B1
(45) Date of Patent: Nov. 3, 2015

(54) DATA MIGRATION TECHNIQUES

(75) Inventors: Matthew Long, Uxbridge, MA (US);
Roy E. Clark, Hopkinton, MA (US);
Dennis Duprey, Raleigh, NC (US);
David Harvey, Newton, MA (US);
Walter A. O'Brien, III, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 475 days.

(21) Appl. No.: 13/535,018

(22) Filed: Jun. 27, 2012

(51) Int. Cl.
*G06F 3/06* (2006.01)
*G06F 13/14* (2006.01)
*G06F 12/00* (2006.01)

(52) U.S. Cl.
CPC ............... *G06F 13/14* (2013.01); *G06F 12/00* (2013.01)

(58) Field of Classification Search
CPC ..... G06F 8/427; G06F 9/4435; G06F 9/5055; G06F 13/14; G06F 3/0617; G06F 3/0689; G06F 3/0647
See application file for complete search history.

(56) References Cited

U.S. PATENT DOCUMENTS

| | | | | |
|---|---|---|---|---|
| 7,548,982 | B2 * | 6/2009 | Gu et al. | 709/228 |
| 7,716,332 | B1 * | 5/2010 | Topfl et al. | 709/226 |
| 8,244,959 | B2 * | 8/2012 | Fusella et al. | 711/103 |
| 8,301,812 | B1 * | 10/2012 | Riordan et al. | 710/74 |
| 8,341,501 | B2 * | 12/2012 | Franceschini et al. | 714/774 |
| 8,504,411 | B1 * | 8/2013 | Subasic et al. | 705/7.33 |
| 8,676,741 | B2 * | 3/2014 | Ulinski et al. | 706/52 |
| 2004/0128618 | A1 * | 7/2004 | Datta | 715/513 |
| 2008/0288863 | A1 * | 11/2008 | Bohannon | 715/255 |
| 2011/0145486 | A1 * | 6/2011 | Owa et al. | 711/103 |
| 2012/0047317 | A1 * | 2/2012 | Yoon et al. | 711/103 |
| 2013/0086302 | A1 * | 4/2013 | Tressler et al. | 711/103 |

FOREIGN PATENT DOCUMENTS

WO    WO 2013014702 A1 * 1/2013

OTHER PUBLICATIONS

Long, Matthew, "Federate Namespace Management", U.S. Appl. No. 13/535,003, filed Jun. 27, 2012.
"Multi-Machine Atomic Seamless Migration", U.S. Appl. No. 12/750,382, filed Mar. 30, 2010, EMC-09-075.
Long, Matthew, et al., "Managing a Port Failover in a Data Storage System", U.S. Appl. No. 13/431,264, filed Mar. 27, 2012.
EMC, "EMC CLARiiON Asymmetric Active/Active Feature", Oct. 2010.

* cited by examiner

*Primary Examiner* — Tuan Thai
*Assistant Examiner* — Mohamed Gebril
(74) *Attorney, Agent, or Firm* — Muirhead and Saturnelli, LLC

(57) ABSTRACT

Described are techniques for migrating data. A source data storage system includes a source device and a target data storage system includes a target device. A passive path and an active path are provided for a host to access data of a logical device. The host recognizes the passive path and the active path as paths to the logical device. The passive path is between the host and the source data storage system. The active path is between the host and the target data storage system and used in connection with proxying requests directed to the logical device received from the host through the target data storage system while migrating data for the logical device from the source device to the target device. Migrating is controlled by a migration module executing on the target data storage system that copies data from the source device to the target device.

19 Claims, 23 Drawing Sheets

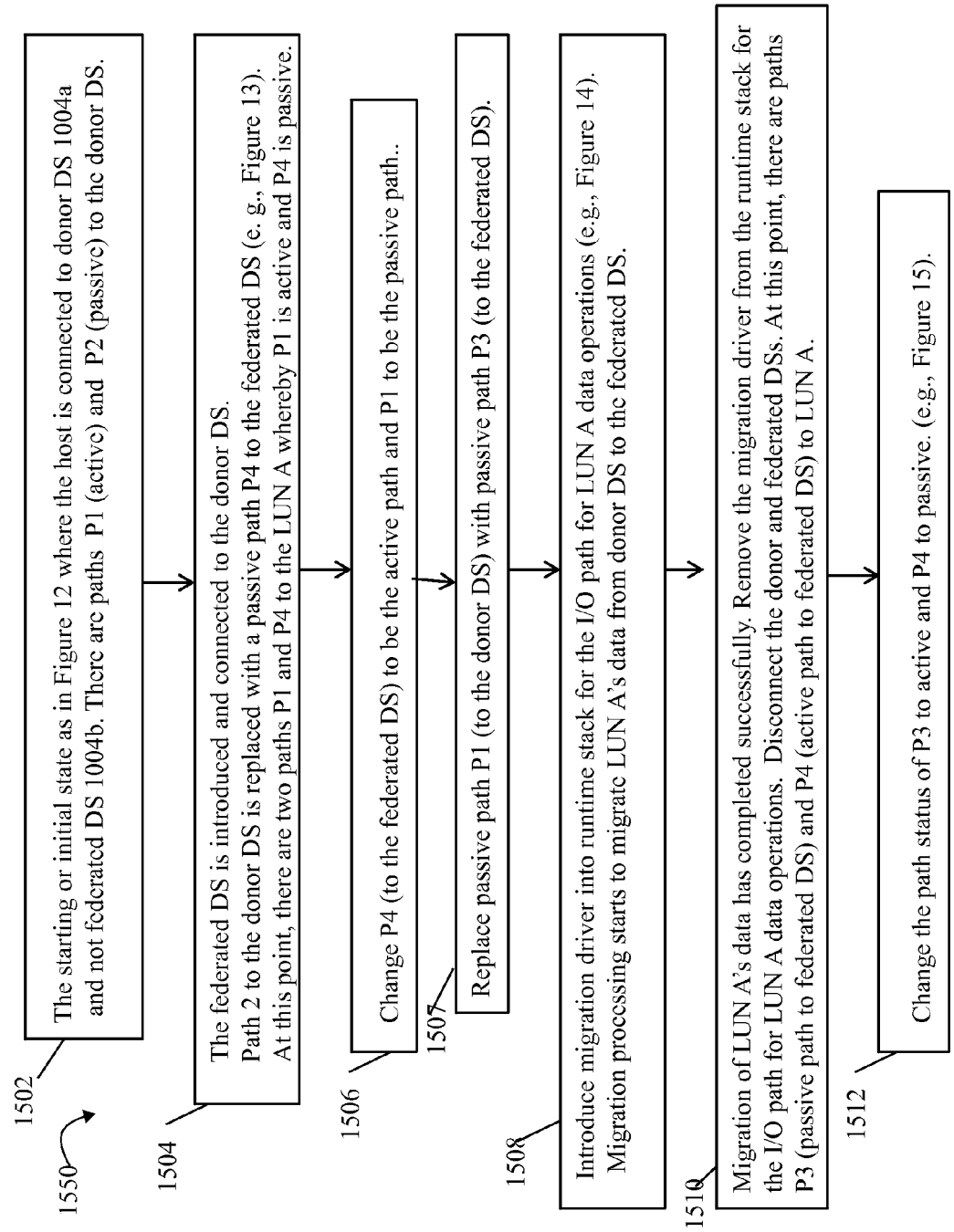

DATA MIGRATION TECHNIQUES

BACKGROUND

1. Technical Field

This application relates to techniques used in connection with data storage systems and more particularly in connection with data migration.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Performance of data storage systems, such as data storage arrays, may be limited by the hardware resources available to service I/O requests. Multiple data storage systems may be aggregated into a federation which act as a single entity and may export the same set of storage. The federation may unilaterally service I/O requests for storage thereby overcoming resource limitations of a single data storage system.

SUMMARY OF THE INVENTION

In accordance with one aspect of the invention is a method of migrating data comprising: providing a source data storage system including a source device and a target data storage system including a target device; providing a passive path and an active path for a host to access data of a logical device, herein the host recognizes the passive path and the active path as paths to the logical device, the passive path is between the host and the source data storage system, and the active path is between the host and the target data storage system, the active path being used in connection with proxying at least some requests directed to the logical device received from the host through the target data storage system while migrating data for the logical device from the source device to the target device; and performing migrating to migrate data for the logical device from the source device to the target device, wherein the migrating is controlled by a migration module executing on the target data storage system that copies data from the source device to the target device. The target data storage system may be included in a data storage federation and the source data storage system may not be included in the data storage federation. The active path may include a first portion from an initiator port of the host to a target port of the target data storage system and data of the source device is accessed using a connection from the target data storage system to the source data storage system. The connection from the target data storage system to the source data storage system may be from a second port of the target data storage system to a third port of the source data storage system. The logical device may have a first device identifier. The first device identifier may be a globally unique world wide name uniquely identifying the logical device from other logical devices. The host may be provided with two additional passive paths to the logical device. The active path, the passive path, and the two additional passive paths may be recognized paths over which the logical device is visible and wherein data of the logical device is accessible to the host over the active path and not accessible to the host over any of the passive path and the two additional passive paths. The active path may be between a port of the host to a first target port of first node of the target data storage system. The first node may include a plurality of modules. The plurality of modules may include the migration module, and the method may further include providing a second passive path from the host to the target data storage system where the second passive path is between the host and a second target port of a second node of the target data storage system and the second node includes a second set of the modules. The active path may be a first path having an active status with respect to the logical device indicating that data of the logical device is accessible over the first path. The passive path may be a second path having a passive status indicating that the second path is a recognized path by the host and that data of the logical device is not accessible over the second path. If data of the logical device is not accessible to the host over the first path, failover processing may be performed which includes setting the first path to the passive status and the second path to the active status. When the second path is set to the active status, the migration module of the second set of the second node of the target data storage system may control migration of data from the source device to the target device, and wherein otherwise when the first path is set to the active status, the migration module of the plurality of modules of the first node of the target data storage system may control migration of data from the source device to the target device. The source data storage system may be configured to use a first set of node identifiers, a first set of target port identifiers and a first set of target port group identifiers, and the target data storage system may be configured to use the first set of node identifiers, the first set of target port identifiers and the first set of target port group identifiers. The target data storage system may replace the source data storage system and the method may include disconnecting the source data storage system from the target data storage system. The method may include performing any of: decommissioning the source data storage system and reprovisioning storage of the source data storage system. The method may include upgrading the source data storage system after migration of data from the source device to the target device has completed; and after completing the upgrading of the source data storage system, migrating data from the target device to any of the source device and another device of the source data storage system. The source data storage system may be replaced with a new data storage system after migration of data from the source device to the target device has completed, and wherein data may be migrated from the target device to another device of the new data storage system, the another device may be presented to the host as having the logical device identifier. Each of the active path, the passive path and the two additional passive paths may include a different target port having a different target port identifier. The active path may be a first path to the logical device having an active status whereby the first path is recognized by the host and used to access data of the logical device and the passive path may be a second path to the logical device having a passive status whereby the second path is recognized by the host and cannot be used to access data of the logical device. Prior to performing migrating and prior to providing the passive path and the active path, the first path and the second path both have the active status, and after migrating has completed, said first path and said second path may both have said active status.

In accordance with another aspect of the invention is a system for migrating data comprising: a source data storage system including a source device; a target data storage system including a target device; a host, wherein the host recognizes two paths to access data of a logical device, a first of the two paths being a passive path to the logical device and the other of the two paths being a second paths that is active path for the host to access data of the logical device, wherein the passive path is between the host and the source data storage system, and the active path is between the host and the target data storage system, the active path being used in connection with proxying at least some requests directed to the logical device received from the host through the target data storage system while migrating data for the logical device from the source device to the target device; and a computer readable medium in the target system, wherein the computer readable medium comprises code stored thereon to perform said migrating to migrate data of the logical device from the source device to the target device, wherein said migrating copies data from the source device to the target device.

In accordance with another aspect of the invention is a computer readable medium comprising code stored thereon for migrating data, the computer readable medium comprising code for: providing a passive path and an active path for a host to access data of a logical device, wherein a source data storage system includes a source device and a target data storage system includes a target device and the host recognizes the passive path and the active path as paths to the logical device, the passive path is between the host and the source data storage system, and the active path is between the host and the target data storage system, the active path being used in connection with proxying at least some requests directed to the logical device received from the host through the target data storage system while migrating data for the logical device from the source device to the target device; and performing said migrating to migrate data for the logical device from the source device to the target device, wherein said migrating is controlled by a migration module executing on the target data storage system that copies data from the source device to the target device.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6, 7, 8, 9, 10, 11, 14A, 14B, 15A, 15B and 19 are flowcharts of processing steps that may be performed in an embodiment in accordance with techniques herein.

DETAILED DESCRIPTION OF EMBODIMENT(S)

Figure 1:
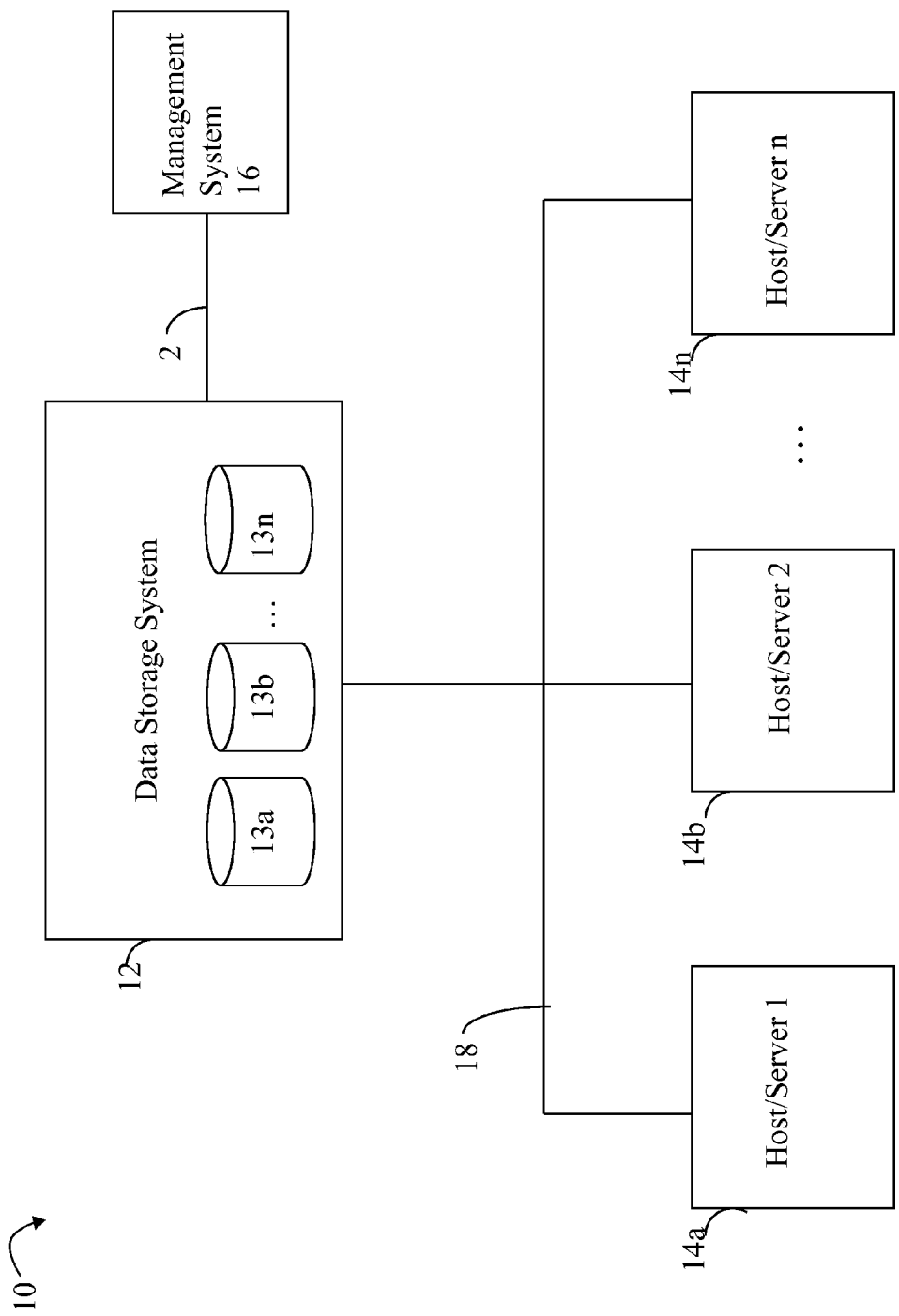
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
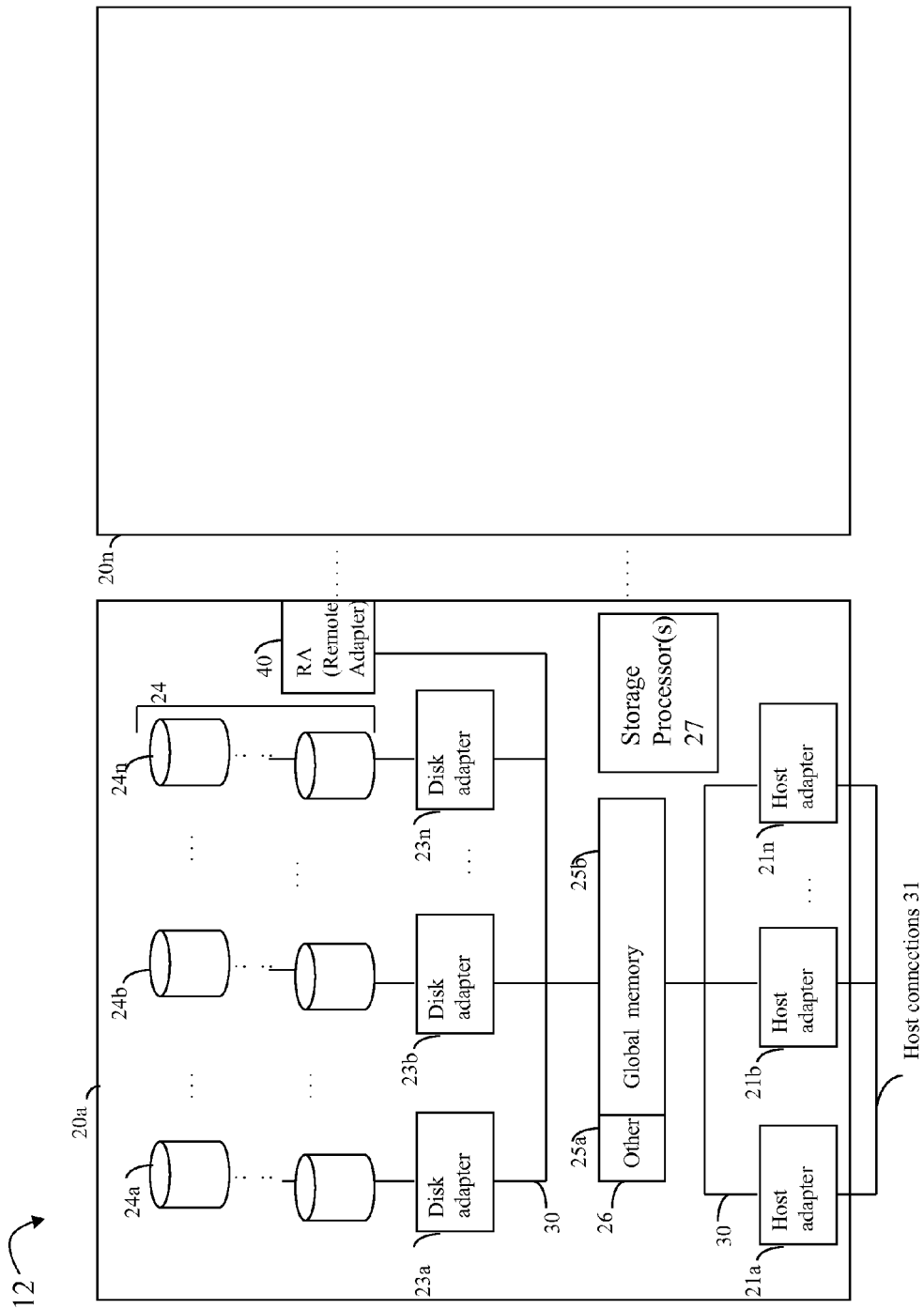
FIGS. 2-3 are examples illustrating details of data storage systems of a federation in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® or VNX™ data storage system by EMC Corporation includes two storage processors (SPs). The system 20a may also include one or more host adapters ("HAs") or directors 21a-21n. Each of the HAs may be used to manage communications and data operations between one or more host systems and the global memory. In an embodiment, the HA may be a Fibre Channel Adapter or other front end adapter (FA) which facilitates host communication. The HA communicates with a component of the host such as a host bus adapter (HBA). Generally, directors may also be characterized as the different adapters, such as HAs (including FAs), DAs RAs, and the like, as described herein. RAs (remote adapters) are described in more detail below. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Performance of data storage systems, such as data storage arrays, may be limited by the hardware resources available to service I/O requests. Multiple data storage systems may be aggregated into a federation which act as a single entity and may export the same set of storage. The federation may unilaterally service I/O requests for storage thereby overcoming resource limitations of a single data storage system. In an embodiment described herein, the data storage systems may be SCSI-based systems, such as a group of SCSI-based data storage arrays, forming a federation. A SCSI based storage federation may be defined as a collection of loosely coupled SCSI based storage systems. An embodiment in accordance with techniques herein may includes hosts and data storage systems of the federation which operate in accordance with the standard SCSI Asymmetrical Logical Unit Access (ALUA) object model. The ALUA standard is defined in T10/SPC-4 specifies a mechanism for asymmetric or symmetric access of a logical unit. The ALUA object model includes objects or entities including a target port group (TPG) and target port. Additionally, techniques herein also utilize entities referred to as nodes which are not a concept of the ALUA standard and its object model but are used in connection with the techniques herein with a federated namespace. These are described in more detail below.

In connection with SCSI-based storage, a path may be formed between an initiator port, such as may be included in an HBA of a host, and a target port of a data storage system, such as a target port of an FA of a data storage system. One or more LUNs may be visible and accessible to the host over one or more paths. A LUN may be visible to a host over a path if the path has been recognized by the host. However, at a point in time, the LUN may not be accessible (e.g., the host cannot issue I/Os to access data of the LUN) over a particular path although the path may be characterized as visible. Thus, the LUN may be visible over multiple paths even though data of the LUN may not be accessible over all such visible paths. In this manner, the host may discover multiple paths to the LUN before the data of the LUN is accessible over all the multiple paths. The LUN may therefore be "moved" (e.g. LUN accessibility to the host is moved) from a first set of target ports to a second set of target ports by having the host discover the paths to the second set of ports prior to the paths to the first set of ports being removed. The foregoing states regarding LUN visibility and accessibility may be representing using different path states and port states in accordance with the ALUA standard.

Each LUN may be uniquely identified by a globally unique WWN (world wide name). Each target port may be uniquely identified with respect to all other target ports in the federation using a unique target port identifier (ID). Each TPG may be uniquely identified with respect to all other TPGs in the federation using a unique TPG identifier (ID). Each node may be uniquely identified with respect to all other nodes in the federation using a unique node identifier (ID). A node may be further characterized as a component including one or more target ports. For example, a node may be an SP or a director (e.g., FA, HA of the data storage system). A TPG may include one or more target ports of a node. Thus, a TPG of a node may be defined to include one or more target ports of the node over which a set of one or more LUNs is visible and may also be accessible. In connection with a federation, the node IDs may be allocated or assigned from a federated node ID range or namespace. The TPG IDs may be allocated or assigned from a federated TPG ID range or namespace. The target port IDs may be allocated or assigned from a federated target port ID range or namespace. Thus, the federation may include multiple federation-level or federation-wide namespaces. The federated TPG ID range or namespace is provided as a single federated namespace for all TPGs across the federation. The federated target port ID range or namespace is provided as a single federated namespace for all target ports across the federation. The federated node ID range or namespace is provided as a single federated namespace for all node identifiers (IDs) across the federation.

Described below are techniques that may be used in connection with management of the data storage system federation namespaces. The techniques herein may be used to create and manage dynamic federated namespaces in accordance with the ALUA object model. As described in more detail below, using such namespaces provides for efficient dynamic namespace management providing benefits and advantages. For example, LUNs may be moved across different TPGs where such TPGs may span across multiple different data storage systems of the federation. The federated namespace management as described herein provides for dynamic management of the federation namespace responsive to configuration and state changes such as, for example, as data storage systems may be added or removed from the federation or otherwise have components thereof modified (e.g., adding or removing nodes thereof), as ports may be added or removed, and as target port groups may be added or removed or otherwise modified (e.g, to add or remove target ports therefrom). The hosts can have continuous availability, redundant paths, redundant arrays and scaled performance along with the benefits of dynamic federated namespace management in accordance with techniques herein.

With ALUA, a LUN is visible with respect to the entire TPG rather than on a port level basis. In other words, a LUN is visible on a TPG level. If the LUN is visible or accessible on a first target port in the TPG including that first target port, then the LUN is also accessible or visible on all targets ports of the TPG. Each TPG can take on a state (e.g., online/active or offline/passive). For a given LUN, the LUN is visible on TPG level basis (e.g. with respect to all target ports of a TPG). As noted above, the LUN may be accessible through multiple TPGs,—TPG A and TPG B—where TPG A may be offline and TPG B may be online thereby characterizing a passive-active model (e.g., passive referring to the offline status of TPG A and active referring to the online status of TPG B). In contrast there may be an active-active model where the LUN is accessible (e.g., online) through both of the foregoing TPGs. TPG A may be on a first SP A of a data storage system and PG B may be on a second different SP B of the same or different data storage system. When the LUN is visible and currently accessible through a first TPG that is online on a first SP, the set of paths defined for the target ports of the TPG may be deemed the active set of paths. In a similar manner, the first TPG and first SP may be characterized as "active". When the LUN is visible through a second TPG of a second SP that is offline so that the LUN is not currently accessible on paths defined for the target ports of the second TPG, the set of paths may be deemed passive. In a similar manner, the second TPG and the second SP may also be characterized as "passive". By providing for both active and passive paths sets for a LUN, the host is able to discover all paths to both the first and second TPGs even though the LUN may not be accessible over all such paths at a point in time.

Consistent with description above and elsewhere herein, it should be noted that use of the term "online" to describe a state may also be characterized as "active". Furthermore, with reference to particular ALUA defined states, a TPG, SP, path or target port for accessing data of a LUN, and the like, having a status of active or online may have an associated ALUA state of active-optimized. Similarly, consistent with description above and elsewhere herein, it should be noted that use of the term "offline" to describe a state may also be characterized as "passive". Furthermore, with reference to particular ALUA defined states, a TPG, SP, path or target port for accessing data of a LUN, and the like, having a status of passive or offline may have an associated ALUA state of standby or unavailable.

In an embodiment which does not utilize techniques herein, when there is an attempt to combine multiple data storage systems into a single federation, add data storage systems to an existing federation, add or remove a target from a TPG, and the like, there may be problems encountered with configuration for the federation since all node IDs, TPG IDs, and target port IDs must be unique across the federation. However, in contrast, an embodiment using techniques herein provides for overcoming such problems by dynamically managing federation namespaces.

In an embodiment described herein, all hosts and nodes in the federation support or operate in accordance with the ALUA standard and associated object model. There may be one or more TPGs per node (e.g., where a node is an SP, director, and the like). Each node may have one or more target ports although a particular number (such as one or two) may be illustrated herein. The federation may have namespaces including those as described above (e.g., a single federated node ID range or namespace, a single federated TPG ID range or namespace, and a single federated target port ID range or namespace). Additionally, each LUN may have a globally unique WWN as also described above to provide for identifying each specific LUN from all other LUNs in the federation.

At least one embodiment of the techniques herein provides for partitioning the federated target port ID range or namespace and partitioning the federated TPG ID range or namespace. In some embodiments, such partitioning may be predetermined or predefined so as to reserve a portion of the foregoing namespaces for a node based on a particular node ID assigned to the node. In some embodiments, such partitioning may be based on a flat-namespace without such pre-determination where a requested number of one or more identifiers may be allocated or assigned from a pool of available or unused identifiers in the namespace. In this manner, management software may facilitate namespace management by tracking identifiers of a federated namespace as they are allocated/assigned and then unallocated/unassigned (thereby returning the identifier as an available identifier of the namespace for reallocation/reassignment). In this manner, the federated namespaces may be managed dynamically responsive to changes over the lifetime or existence of the federation (e.g. whereby entities such as TPGs, target ports, and nodes may added or removed).

As also described below, the federation may provide a management interface with one or more APIs (application programming interfaces) for management of the federation namespace implementing the functionality described herein. Additionally, it should be noted that such functionality for the management techniques described herein for the federated namespace may be implemented in a variety of ways such as, for example, using a single management system with management software and database/data store of management information thereon. The database may be updated based on the current state of the federation and inquiries or requests (including SCSI requests for information about the federation management) using the API may be directed to the management software. Such management software may execute, for example, on the management system 16 of FIG. 1.

Figure 3:
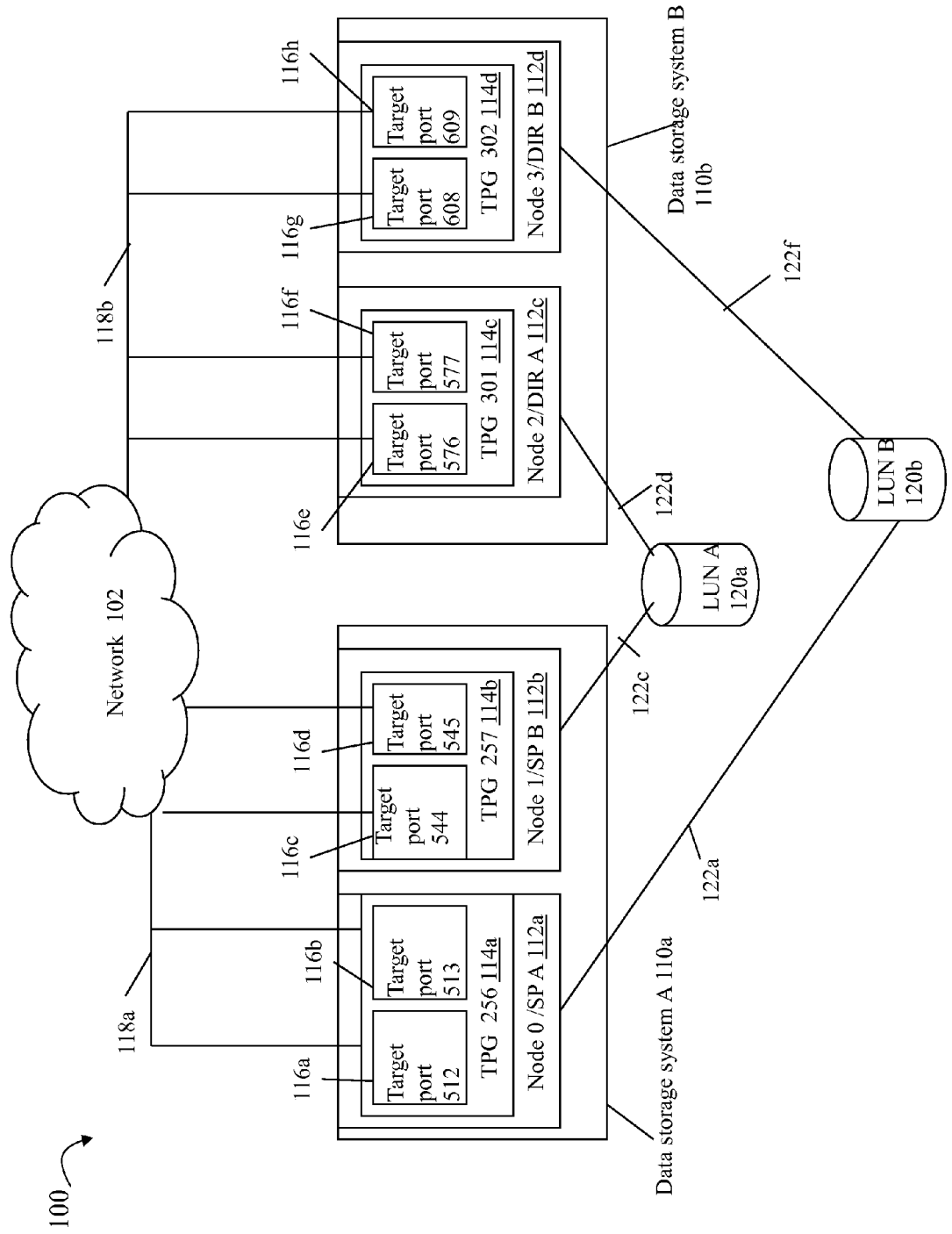

Referring to FIG. 3, shown is an example of a networked group of data storage systems that form a federation in an embodiment in accordance with techniques herein. The example 100 includes a network 102, data storage system A 110a, data storage system B 110b, nodes 112a-112d, TPGs 114a-114d, and target ports 116a-116h. Although not illustrated in FIG. 3 but described, for example, in connection with FIG. 1, one or more hosts may communicate with the data storage system 110a, 110b over network 102. The example 100 provides additional detail of components described above in connection with other figures.

Data storage system A 110a includes two nodes SPA 112a and SP B 112b. SP A 112a may have an assigned node ID of 0. SP B 112b may have an assigned node ID of 1. SPA 112a has a defined TPG 256 114a including two target ports 116a, 116b. It should be noted that TPG 114a has a TPG ID of 256, target port 116a has a target port ID of 512, and target port 116b has a target port ID of 513. SP B 112b has a defined TPG 257 114b including two target ports 116c, 116d. It should be noted that TPG 114b has a TPG ID of 257, target port 116c has a target port ID of 544, and target port 116d has a target port ID of 545.

Data storage system B 110b includes two nodes which are directors—DIR A 112c and DIR B 112d. DIR A 112c may have an assigned node ID of 2. DIR B 112d may have an assigned node ID of 3. DIR A 112c has a defined TPG 301 114c including two target ports 116e, 116f. It should be noted that TPG 114c has a TPG ID of 301, target port 116e has a target port ID of 576, and target port 116f has a target port ID of 577. DIR B 112d has a defined TPG 302 114d including two target ports 116g, 116h. It should be noted that TPG 114d has a TPG ID of 302, target port 116g has a target port ID of 608, and target port 116h has a target port ID of 609.

LUN A 120a is visible over paths have target ports in TPG 114b of data storage system 110a and TPG 114c of data storage system 110b. LUN B 120b is visible over paths have target ports in TPG 114a of data storage system 110a and TPG 114d of data storage system 110b. For LUN A 120a, SP B of data storage system 110a may be the active SP/node so that LUN A 120a may be visible and accessible to hosts over target ports of TPG 114b. For LUN A 120a, DIR A of data storage system 110b may be the passive DIR/node so that LUN A 120a may be visible but not accessible to hosts over target ports of TPG 114c. For LUN B 120b, SP A of data storage system 110a may be the active SP/node so that LUN B 120b may be visible and accessible to hosts over target ports of TPG 114a. For LUN B 120b, DIR B of data storage system 110b may be the passive DIR/node so that LUN B 120b may be visible but not accessible to hosts over target ports of TPG 114d. In this manner, a host may discover and recognize both active and passive paths to each LUN 120a, 120b even though the LUNs 120a, 120b may not be accessible on all such paths. As described above, this enables the host to discover a set of one or more paths over which the storage is visible but not accessible prior to the data of the storage being accessible on the set of paths. As will be appreciated by those skilled in the art, the foregoing representation of FIG. 3 may be snapshot of a state of the data storage system in connection with moving a LUN, such as LUN A 120a from being accessible over a first TPG 112b to be accessible over a second TPG 112c (which is currently passive in FIG. 3). In this case, the paths using TPG 112b may be referred to as current or old paths, the paths using TPG 112c may be referred to as the new paths, and the goal may be to move the LUN A 120a from TPG 114b to TPG 114c. As a step in this process, the host must be able to discover both the old and new paths, respectively through TPGS 114b, 114c. At some later point, the new paths through TPG 114c will become active (where LUN A 120s is both visible and accessible through the new paths) and the old paths 114B will become passive (where LUN A 120s is visible but not accessible through the old paths).

The example 100 provides an illustration resulting from management of federated namespaces utilizing techniques herein as described in following paragraphs whereby node IDs, target port IDs and TPG IDs may be assigned/allocated and deassigned/deallocated as needed in accordance with changes in the federation. For example, after performing the LUN A 120a movement or relocation from TGP 114b to 114c, and similarly relocating LUN B 120b from TPG 112a to 112d, it may be desirable to remove data storage system 110a from the federation, remove a node of the 110a, and the like. In this manner, the techniques described in following paragraphs may be used to then deallocate all node IDs, target port IDs and TPG IDs assigned for use with data storage system 110a thereby making such identifiers available for reassignment or reallocation from their respective federation wide namespaces.

Described in following paragraphs are particular examples and algorithms illustrating how the federated namespace may be managed.

In one embodiment in connection with techniques herein for federated namespace management, as a first step, a node may be assigned a unique node ID. The embodiment may limit or restrict the range of possible node IDs as will now be described.

Assume that there may be a maximum number of ports allowable for any node such as, for example, 32 ports/node. For purposes of illustration, 32 will be used but generally any suitable number may be selected and may also be configurable. As a second assumption, there is a data field of a certain size used to specify a port ID. For example, the data field representing each port ID may be a 16 bit field providing for $2^{16}$ different values as unique port IDs (e.g. range is from 0 ... ($2^{16}$−1)). Additionally, an embodiment may want to reserve a portion of the port IDs in the federated port ID range or namespace for one or more purposes. For example, an embodiment may reserve the first 512 of these port IDs for possible use with legacy data storage systems in the federation such as, for example, where such a legacy data storage system requires or has specific port identifiers that it uses as may be included in this reserved portion of 512 port IDs.

In connection with one embodiment using techniques herein for federated namespace management, a node number which is the unique node ID may be used to partition or reserve a particular portion of the federated target port ID range or namespace associated with that particular node ID. In this manner, a node may be registered with the federation management software as being assigned a particular node ID. The software may track what node IDs of the federated nod ID range or namespace are currently assigned to nodes and which of the nodes IDs are otherwise unassigned (e.g., thereby being available for use or for subsequent assignment). The management software may predefine or associate a particular set of port IDs with each possible node ID. When a node ID is assigned, the node ID may also be assigned the associated set of port IDs for that particular assigned node ID. Thus, the management software may track which node IDs are assigned at any point in time and may also identify which subrange or partition of all possible port IDs are assigned or allocated from the possible federated port ID namespace based on the particular node IDs.

For example, the following EQUATION 1 may be used to represent the calculation of the maximum number of possible node IDs (MAX NODE IDs):

$$\text{MAX NODE IDs} = \text{TOTAL TARGET PORT IDs} / \text{MAX PORTS PER NODE} \qquad \text{EQUATION 1}$$

where

MAX PORTS PER NODE is the maximum limit or upper bound on the number of ports allowable per node; and TOTAL TARGET PORT IDs represents the total number of possible target port identifiers in the federated target port ID namespace.

For example, the MAX PORTS PER NODE may be 32 or some other suitable number that may be configurable. The TOTAL TARGET PORT IDs (representing the maximum number of possible target port identifiers in the federated target port ID namespace that can be assigned) may be based on the number of bits or size of the data field used in storing a port ID. As noted above, the size of the field used to represent a port ID may be 16 bits thereby providing for a maximum of $2^{16}$ or 65,536 possible unique port IDs in the federated target port ID namespace. Additionally, some embodiments may wish to further reserve a portion of the federated port ID namespace as described above. For example, an embodiment may reserve the first 512 port IDs of the port ID namespace for possible use with a legacy array that requires or has specific port identifiers that it uses. In a similar manner, an embodiment may reserve some other portion of the port ID namespace for other uses as may be needed. In connection with this particular example consistent with EQUATION 1 where MAX PORT IDs=32 and TOTAL TARGET PORT IDs=65,536-512, the MAX NODE IDs=2032 (e.g. which may be denoted by the inclusive zero-based range of 0 ... 2031). Thus, in one embodiment the federated node ID range or namespace is the inclusive numeric range of 0 ... 2031.

Figure 4:
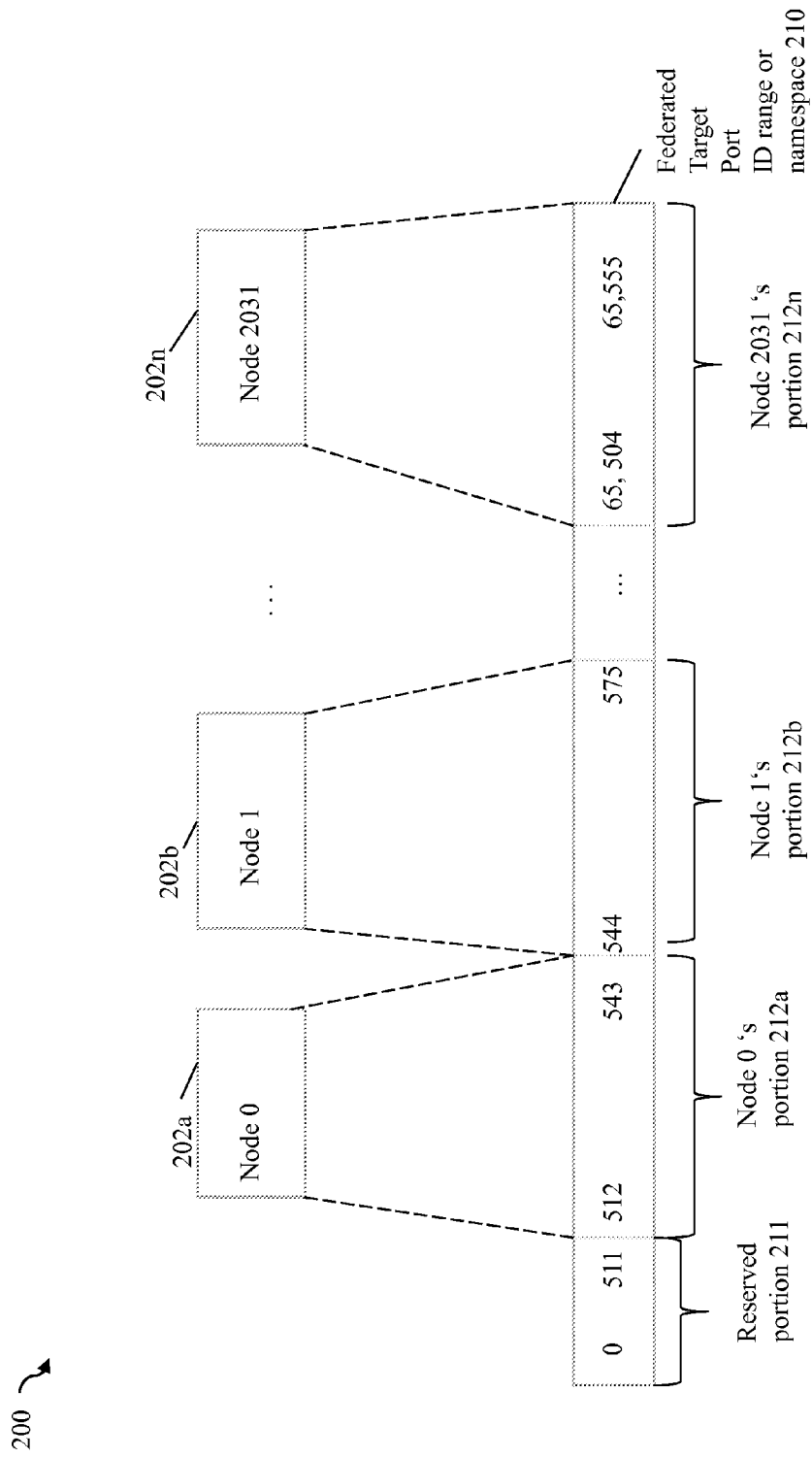
FIG. 4 illustrates a mapping of a node identifier to a portion of the federated target port ID range or namespace in an embodiment in accordance with techniques herein.

To further illustrate and continuing with the above-mentioned example, reference is made to FIG. 4. It should be noted that the example 200 uses zero-based notation for the identifiers. The example 200 is an illustration of how the federated target node ID range or namespace may be partitioned in an embodiment in accordance with techniques herein. As described above, a range of target port identifiers may be reserved for each node based on the node number or node ID and a predefined maximum number of ports per node (MAX PORTS PER NODE). The example 200 includes an element 210 representing the entire federated target port ID range or namespace which may be partitioned into portions or subranges associated with particular possible NODE IDs. Additionally, an embodiment may optionally reserve a portion of 210 which is represented as 211 in this example for the first 512 target port IDs. Elements 202a-202n may represent the possible 2032 node IDs that may be assigned and comprise the federated nod ID range or namespace. Element 211 represents the reserved portion of the federated target node ID range or namespace 212. Element 212a represents that portion of 210 which is reserved for node 0 202a. In particular, target node IDs 512-543, inclusively, may be reserved for use by node 0 202b. Element 212b represents that portion of 210 which is reserved for node 1 202b. In particular, target node IDs 544-575, inclusively, may be reserved for use by node 1 202b. The following may be similarly performed with respect to each node up to the maximum possible node id of 31 as represented by 202b having reserved for it use portion 212n.

As described above, it should be noted that having a reserved portion 211 is optional and an embodiment may alternatively have no reserved portion 211 thereby making the entire range 210 available for use by the nodes. As yet a further variation, an embodiment may have one or more reserved portions 211 which may each represent a different contiguous portion of 210.

There is management software which tracks what node IDs have been assigned to nodes of the federation at each point in time. Generally, by default, the management software may assign a node the predefined range or portion of 210 when assigning the node ID to the node. In this manner, the node may obtain its customized reserved portion and the node itself may then manage use of its own portion of 210 as target ports may be added and/or removed from each node. For example, a node may have registered with the management software and assigned a node ID. As a result once the node ID has been assigned, the management software may reserve and return to the node the particular target port IDs reserved for the node based on the node ID. The particular reserved target port IDs for a given node ID may be returned explicitly as a result of the same API call for assigning the node ID, may be explicitly returned as a result of a subsequent API call (even though the management software may reserve the portion of the target port IDs once the node ID has been assigned), or may be known and used implicitly by the node or data storage system requesting assignment of a node ID.

An embodiment may provide a first API call that may be made to register a node and return an assigned node ID. Subsequently, the node may make another reservation call to the management software using an API to reserve a particular number of target port IDs such as using the following API:
ReserveRelativeTargetPortIdentifiers(nodeID, amountRequested, &arrayOfIDs)

where nodeID is the assigned node's identifier, amountRequested is the number of target port IDs which are being requested in this reservation call, and &arrayOfIDs is an array filled in with the specific target port IDs reserved for the node with this call. As a value for amountRequested, the node may be allowed to specify any number up to the allowable maximum such as 32 in this particular example. In a similar manner, an embodiment may provide a release API operation which is simply the converse or opposite of the above-mentioned reservation API to release and return the specified target port IDs to the federation pool of target port IDs for use by other nodes. The following is an example of a release API:
ReleaseRelativeTargetPortIdentifiers (nodeID, amountToRelease, &arrayOfIDsToRelease)

where node ID is as described above, amountToRelease may be an integer value specifying a size or number of entries in &arrayOfIDsToRelease, and &arrayOfIDsToRelease may be an array of integers specifying the target port IDS being released.

Using the above-mentioned reserve and release APIs, an embodiment may allow a node to issue one or more requests to the management software to request a particular number of target port IDs. The APIs may be implemented using code which performs processing based on the algorithm described above and illustrated in connection with FIG. 4. (e.g., based on the calculation RelativeTargetPortIdPoolStart=ReservedIdentifiers+ (NodeID*MAX PORTS PER NODE) where "RelativeTargetPortIdPoolStart" identifies the starting target port identifier for a node having the particular "NodeID", "MAX PORTS PER NODE" is as described above, and "ReservedIdentifiers" represents the number of target port IDs in the reserved portion 211. An embodiment implementing the techniques illustrated in FIG. 4 may assign a node ID. By assignment of this node ID, the management software also designates a predetermined or predefined reserved portion of the federated target port ID range or namespace 210 and assigns the foregoing reserved portion to the node having the assigned node ID. Thus, an embodiment may implement the techniques illustrated in FIG. 4 using one or more management APIs.

More generally and alternatively, the API code may perform processing using other suitable techniques besides the exemplary one described in connection with FIG. 4. the processing may allocate requested target port IDs to requesting nodes in any suitable manner (e.g., as in FIG. 4 or alternatively based on requested amounts specified in each call without reserving an entire predetermined portion of the namespace based on the assigned node ID as FIG. 4) so long as the management software accurately manages the federation target port ID range or namespace 210 by tracking which target port IDs are used/allocated and which target port IDs are available for allocation in connection with subsequent requests at each point in time during operation of the federation. In this manner, a node may issue, for example, multiple calls using the above-mentioned ReserveRelativeTargetPortIdentifiers API and be allocated a set of target port IDs and may issue multiple calls using the above-mentioned ReleaseRelativeTargetPortIdentifiers API as may be needed over time based on the needs of each node. Such target port IDs may or may not be allocated from a predetermined or predefined reserved portion of the target port ID federation namespace 210 based as the node ID depending on the particular algorithm utilized. For example, node 0 may issue a first API call to reserve 10 target port IDs which may simply be the next 10 available or selected target port IDs in 210 without regard/independent of the particular node ID. For example, target port IDs 1-10 may be reserved and returned to node 0 and the management software may track that these target port IDs of 210 have been assigned to a node 0. Subsequently, node 1 may issue an API call to reserve 20 target port IDs which may simply be the next 10 available and/or selected target port IDs in 210. For example the target port IDS 11-30 may be reserved and returned to node 1 and the management software may track that these target port IDs of 210 have been assigned to a node 1. Thus, the federated target port ID namespace may be managed in some embodiments as a flat namespace across the entire federation whereby any node may be assigned target port IDs from any portion thereof as tracked by the management software.

It should be noted that the target port identifiers as requested by each node may be persistently stored by the node so that the node does not need to reissue reservation calls to the management software each time the node boots.

Figure 5:
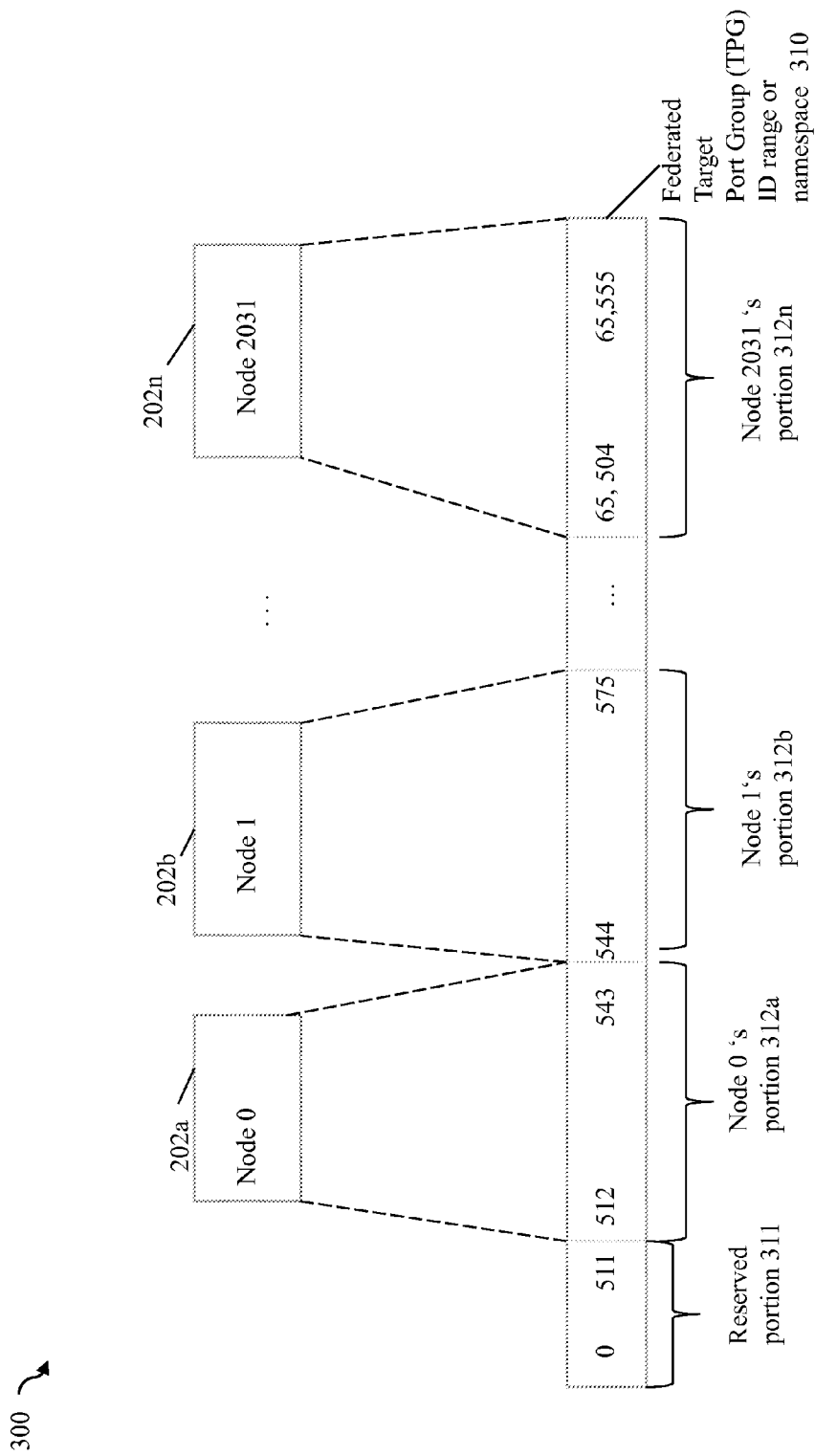
FIG. 5 illustrates a mapping of a node identifier to a portion of the federated target port group (TPG) ID range or namespace in an embodiment in accordance with techniques herein.

In a similar manner as described above for target port IDs, the federated namespace for TPGs may be managed. For example, in a manner similar to that as described above in connection with FIG. 4, a number of TPGs may be reserved based on the particular node ID assigned to a node. For example, the TPG identifier may be specified in a 16-bit field. Reference is made to FIG. 5 which illustrates in 300 how a portion of the federated TPG ID range or namespace 310 may be reserved and mapped to a particular node ID. Element 311 may represent a reserved portion of 310 in manner similar to 211 of FIG. 4. Element 312a-312n may represent the portions of 310 which are assigned to respective node identifiers 202a-202n. Thus, an embodiment may allocate and assign TPG identifiers as illustrated in FIG. 5 in a manner similar to that as described in FIG. 4 thereby providing a maximum of 32 TPGs per node. APIs as described above in connection with target port IDs may also be used in connection TPG management using the technique illustrated in FIG. 5, simply based on the next available TPG ids, and the like, as described above in connection with target port IDs. It should be noted that although the same specific values are illustrated in connection with the examples of FIGS. 4 and 5, it will be appreciated by those skilled in the art that the values used in connection with target port IDs and TPG IDs may differ from one another and may vary from what is described herein. For example, the sizes/number of bits of the fields used to represent the target port IDs and TPG IDs, the assumed maximums (e.g., maximum number of ports per node and maximum number of TPGs per node), and the like, may differ and vary from what is described herein. In one embodiment, there may be only a single TPG for each node although an embodiment may have more than one TPG per node. As will be appreciated by those skilled in the art, the techniques herein may be readily adapted for use in an embodiment having multiple TPGs per node. For example, a number of target port IDs and TPG IDs may be assigned to a node having an assigned node ID based on any suitable technique (e.g. using predetermined or predefined portions of the federation name spaces based on the assigned node ID as in FIGS. 4 and 5, assigning the requested number of target port IDs and TPG IDs based on any available/unallocated ones in the federation namespaces, and the like). Further management of which target port IDs are included in a particular TPG ID may be performed locally by a node which may simply request the number of target port IDs and the number of TPG IDs.

In the embodiment described herein, the management software, or other software, may store additional state information regarding the state of the different target ports and TPGs. As described herein, the state of an individual target port cannot be changed but rather such state may be maintained at the TPG level thereby indicating a state applied to all target ports in the TPG. Thus, an embodiment may maintain federated management state information denoting a state of each TPG. Thus, when a node fails, the TPGs of that node may accordingly have their state updated to reflect the fact that the LUNs are not available on paths through ports of the failed node.

In connection with adding a data storage system to the federation, requests may be issued to the management software. In an embodiment described herein such as operating in accordance with FIGS. 4 and 5 whereby the associated target port IDs and TPG IDs may be based on the assigned node ID, communications with the management software may be required only once to initially assign node ids. From this node ID, each node is able to determine and manage locally its own reserved portion of the federated namespaces 210 and 310. The node may persistently store its assigned node ID so that upon reboot, for example, the node may automatically determine its assigned target port IDs and TPG IDs without requiring further communications with the management software to obtain assigned target port IDs and TPG IDs.

While the system is running as in connection with a SCSI-based system in accordance with the ALUA standard, there may be an inquiry from a host to any node in the federation for information about the federation. The inquiry may be for information regarding the data storage configuration and/or associated state information regarding nodes, TPGs and/or target port IDs. The current federation management information may be provided or otherwise available to the node (that receives the inquiry) for responding to the inquiry. An embodiment may use any suitable technique in connection with providing such up to date information to all nodes of the federation thereby enabling each node of the federation to consistently respond to an inquiry from the host. For example, a technique may be used to facilitate internode communication so that when there is a state or configuration change on a node, each node may push its change such as via broadcast to all other nodes thereby enabling each node to maintain a local copy regarding the configuration and state of all other nodes. It should be noted that as described herein, each node may perform local namespace management based on the reserved portions of the TPG and target ID namespaces assigned to a node (such as may be based on node ID). In this manner, the reserved portions of the federated namespaces may be reserved for a node. However, not all target IDs and not all TPGs in these reserved portions may be further allocated or assigned locally by the node. For example, the local allocation/use of a node's reserved portion may vary over time depending on particular ports included in a TPG or node at different points in time. As ports are added/removed from a node and TPG, the local node management may use different target port IDs from the node's reserved portion of the federated name space. The node may notify other nodes regarding such local management allocations/uses and deallocations as particular target ports may be included in the node. As a variation, an embodiment may use a data pull technique whereby, responsive to a node receiving an inquiry for information, the node may request node-local information from other nodes in order to formulate an inquiry response for the host.

Consistent with the foregoing, a node may be assigned a node ID such as when the data storage system including the node is added to the federation or when the node itself is added as a new node to a data storage system currently in the federation. Once a node has been assigned a node ID from the federated node ID range or namespace, the node may also be assigned a TPG id from the federated TPG ID range or namespace for each TPG created. The node may also be assigned a set of one or more target port IDs from the federated target port ID range or namespace. The node may then perform node local management of the allocated target port IDs by adding one or more of its assigned target port IDs as needed to the TPG. Thus, the node may have an assigned number of target port IDs. At any point in time, any one or more of the assigned target port IDs may be included in a TPG or may otherwise not be associated with any target port. Such dynamic association of a target port ID (from the node's assigned set of target port IDs) to a particular TPG may be performed locally by each node. Once TPGs have been defined to include one or more target port IDs associated with target ports of the node, LUNs may be made visible and accessible through one or more of the configured TPG(s). As changes may be made to the federation, management of the associated namespaces may be performed locally at a node and/or through communications with the data storage management software. For example, TPGs may come in and out of existence, respectively, as nodes may be added and removed. Once target port IDs are assigned to a node, the node may locally perform management as ports may be added or removed from TPGs. As another example, a node may be added or replaced in a data storage system of the federation, an entire new data storage system may be added to the federation, an entire data storage system may be removed from the federation, and the like.

A node of a storage array may be booted at different times. As part of the boot process or subsequent to the boot process, the node may perform processing to obtain its previously allocated node ID, TPG ID(s), and/or target port ID(s) for use. Otherwise, if the node had not previously been allocated such identifiers, processing may be performed to request an assigned node ID along with any other identifiers for TPGs and target ports as described herein.

What will now be described are flowcharts in FIGS. 6-9 which summarize processing steps described above for particular embodiments described herein. In these examples, described is an embodiment in which target port IDs and TPG IDs may be managed in accordance with FIGS. 4 and 5.

Figure 6:
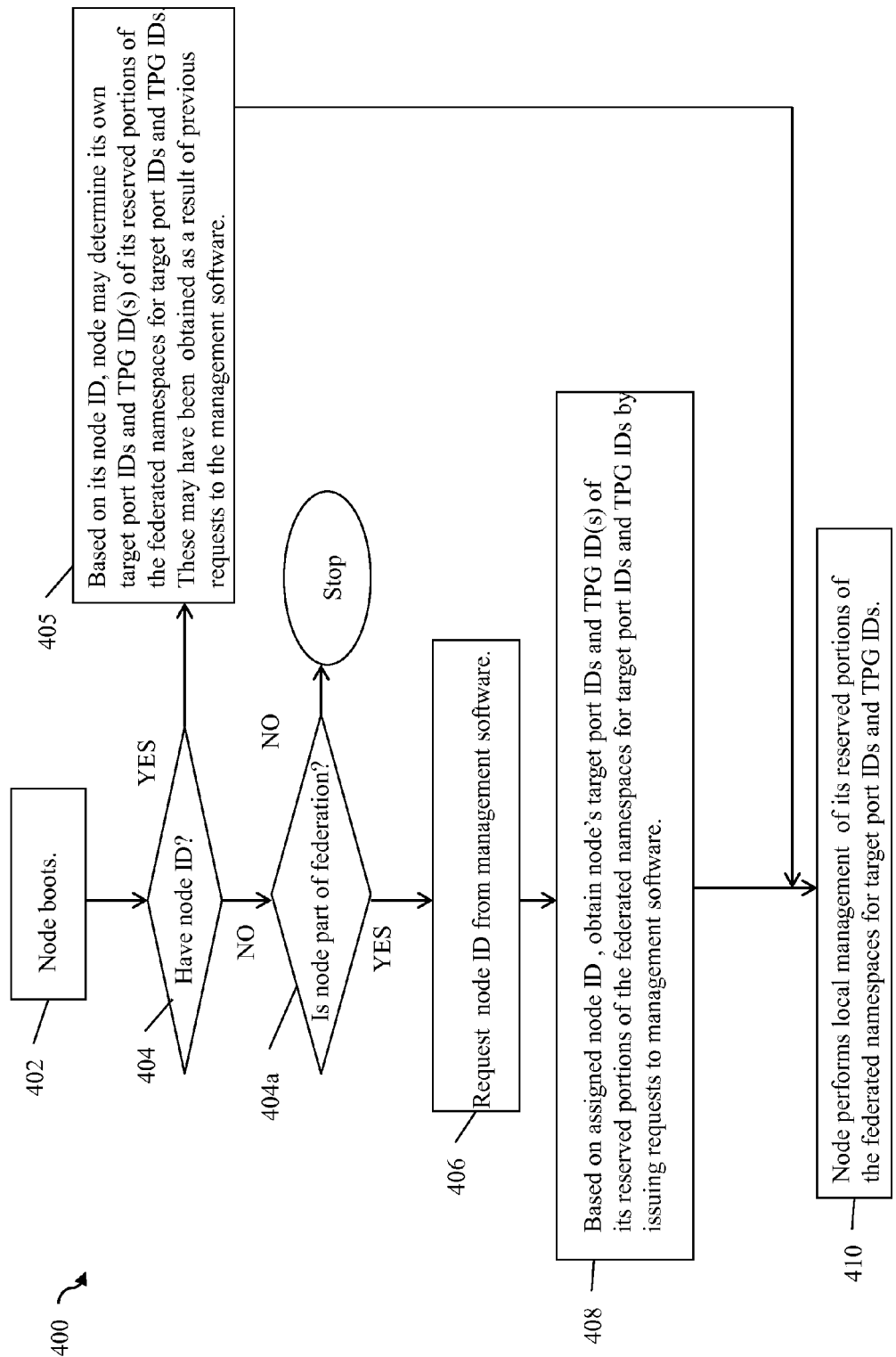

Referring to FIG. 6, shown is an example of a flowchart of processing that may be performed in an embodiment in accordance with techniques herein when booting a node of a data storage system, such as an array, which is part of the data storage system federation. At step 402, the node boots. At step 404, processing may be performed such as part of booting the node which determines whether the node has an assigned node ID. If step 404 evaluates to yes, control proceeds to step 405. In this example it is assumed that the booting node was previously assigned (prior to booting) one or more TPG IDs and one or more target port IDs. The node may persistently store these identifiers for retrieval and use in step 405 as part of node boot processing. In this example using the predetermined reserved portions based on node ID, the node may simply persistently store its node ID and may calculate its reserved portions of the TPG and target port ID federation namespaces. Control proceeds to step 410.

If step 404 evaluates to no, control proceeds to step 404a where a determination is made as to whether the node currently belongs to the federation. It should be noted that a flag or other state information may be maintained to denote whether a node belongs to a federation. In one embodiment, nodes may be explicitly added such as by a user issuing commands to the management software to add nodes to the federation. Once such nodes are added to the federation such as via the management software commands as noted above, a flag may reflect that the node is a member of the federation. If step 404a evaluates to no, processing stops. If step 404a evaluates to yes, control proceeds to step 406 where a node ID is requested from the management software such as using an API call. At step 408, based on the assigned node ID, the node's target port IDs and TPG ID(s) may be obtained from its reserved portions of the federation namespaces. In one embodiment, the foregoing identifiers may be obtained by issuing requests to management software. For example, a first request to the management software may be made to request one or more TPG IDs. A second request may then be issued to the management software for one or more target port IDs. Alternatively, rather than issue such individual requests, reserved portions of the federation namespaces for TPG IDs and target port IDs may be performed implicitly as a results of requesting the assigned node ID. In step 410, the node performs local managements of its reserved portions of the federated name spaces for target IDs and TPG IDs.

It should be noted that the processing of 400 may be generally performed as per-node processing such as, for example, when initially creating a federation, when adding a node to a data storage system currently in the federation, and the like.

Figure 7:
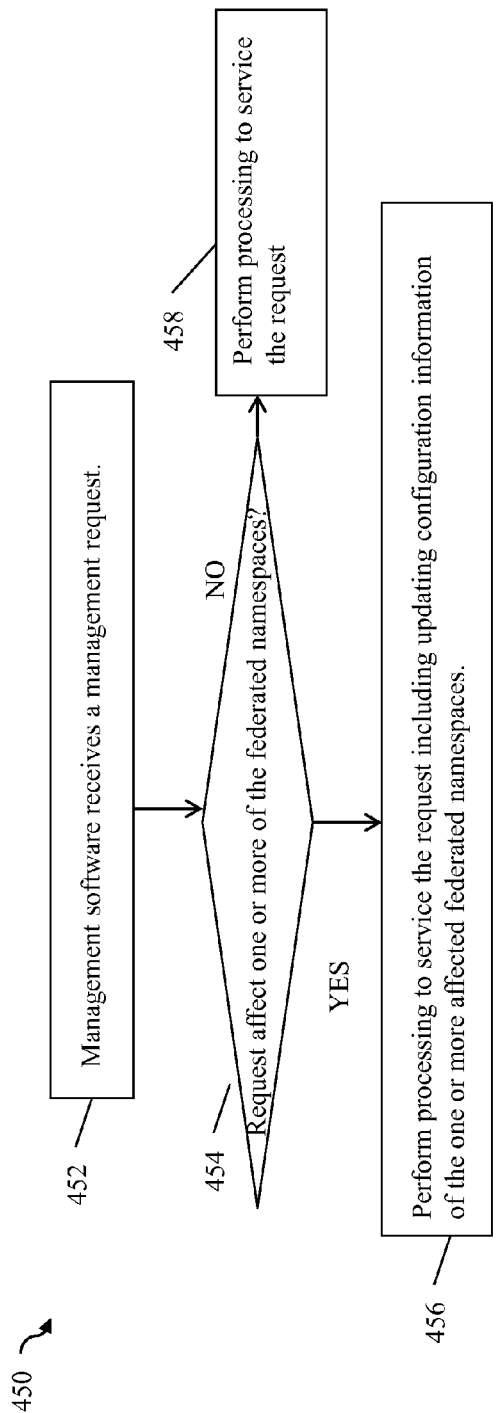

Referring to FIG. 7, shown is a flowchart of processing steps that may be performed by management software in connection with processing requests such as described in connection with flowchart 400 processing. At step 452, the management software receives a management request. At step 454, a determination may be made as to whether the request affects the current allocation or assignment of one or more of the federated namespaces. If step 454 evaluates to yes, control proceeds to step 456 to perform processing to service the request where such processing may include updating the configuration information of the one or more affected federated namespaces. Such requests affecting the current allocation or assignment of one or more of the federated namespaces may include node ID assignment or node ID removal requests, target port ID assignment or deallocation requests, and TPG ID assignment or deallocation requests. If step 454 evaluates to no, control proceeds to step 458 to perform other processing to service the request.

Figure 8:
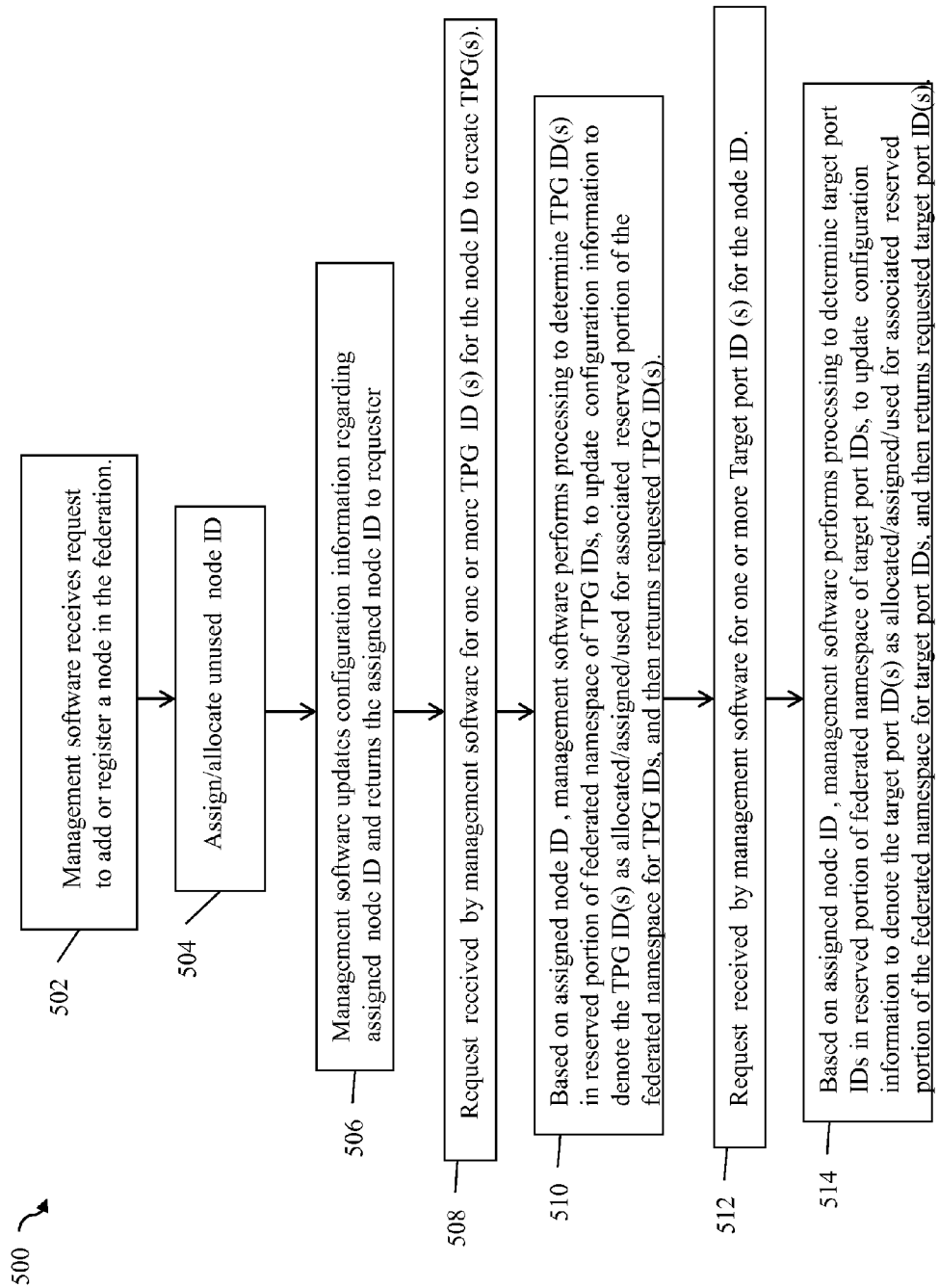
Figure 9:
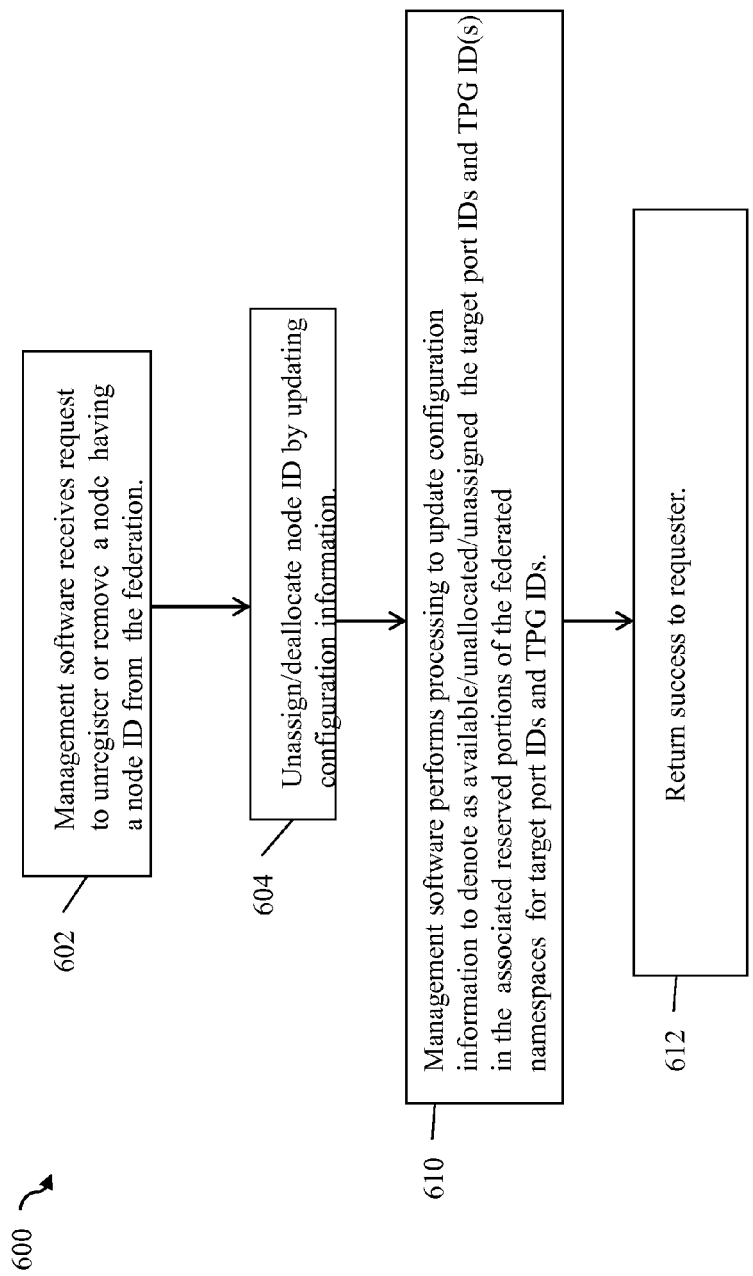

FIGS. 8 and 9 provide additional detail regarding processing for different types of requests received by the management software.

Referring to FIG. 8, shown is a flowchart of processing steps that may be performed by management software in connection with processing requests such as described in connection with flowchart 400 processing. In this example, it is assumed that requests are issued to the management software for assignment of target port IDs and also TPG IDs.

At step 502, the management software receives a request to add or register a new node with the federation. At step 504, processing is performed to assign or allocate an unused node ID to the node. In step 506, the management software updates configuration information regarding the node ID now being assigned/allocated, and then returns the assigned node ID to the requester. In step 508, the management software may receive a request for one or more TPG IDs to be assigned based on the node ID as part of creating or defining TPGs. In step 510, based on the node ID, management software performs processing to determine TPG ID(s) in the reserved portion of federated namespace of TPG IDs, to update configuration information denoting the TPG ID(s) as allocated/assigned from the federated namespace for TPG IDs, and then returns requested TPG ID(s). In step 512, a request may be received by the management software for assignment of one or more target port IDs for the specified node ID. Based on the node ID, management software performs processing to determine target port IDs in the reserved portion of federated namespace of target port IDs, to update configuration information to denote the target port ID(s) as allocated/assigned from the federated namespace for target port IDs, and then returns requested target port ID(s).

Referring to FIG. 9, shown is a flowchart of processing steps that may be performed by the management software in connection with removing a node from the federation. In step 602, the management software may receive a request to unregister or remove a node having a particular node ID from the federation. In step 604, the node ID may be unassigned or deallocated by updating configuration information. At step 610, management software may further perform additional processing to update configuration information to denote as available/unallocated/unassigned the target port IDs and TPG ID(s) of the reserved portions of the federated namespaces for target port IDs and TPG IDs. It should be noted that step 610 processing may be performed implicitly as part of the unregistration request such as illustrated in 600, or may otherwise be performed as the result of one or more additional explicit requests to the management software (e.g., one request to unassign the target port IDs and another request to unassign the TPG IDs). In step 612, a response such as indicating success may be returned to the requester.

Figure 10:
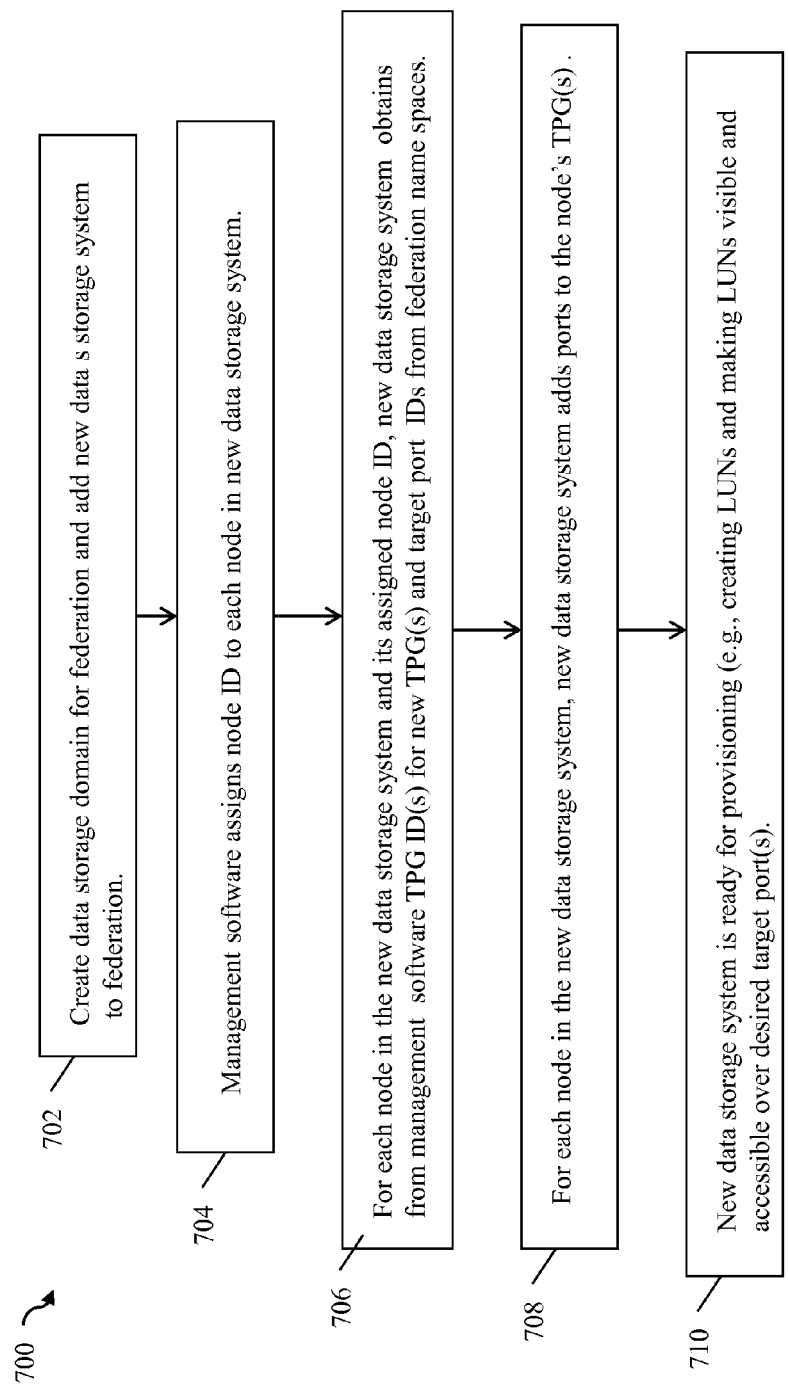
Figure 11:
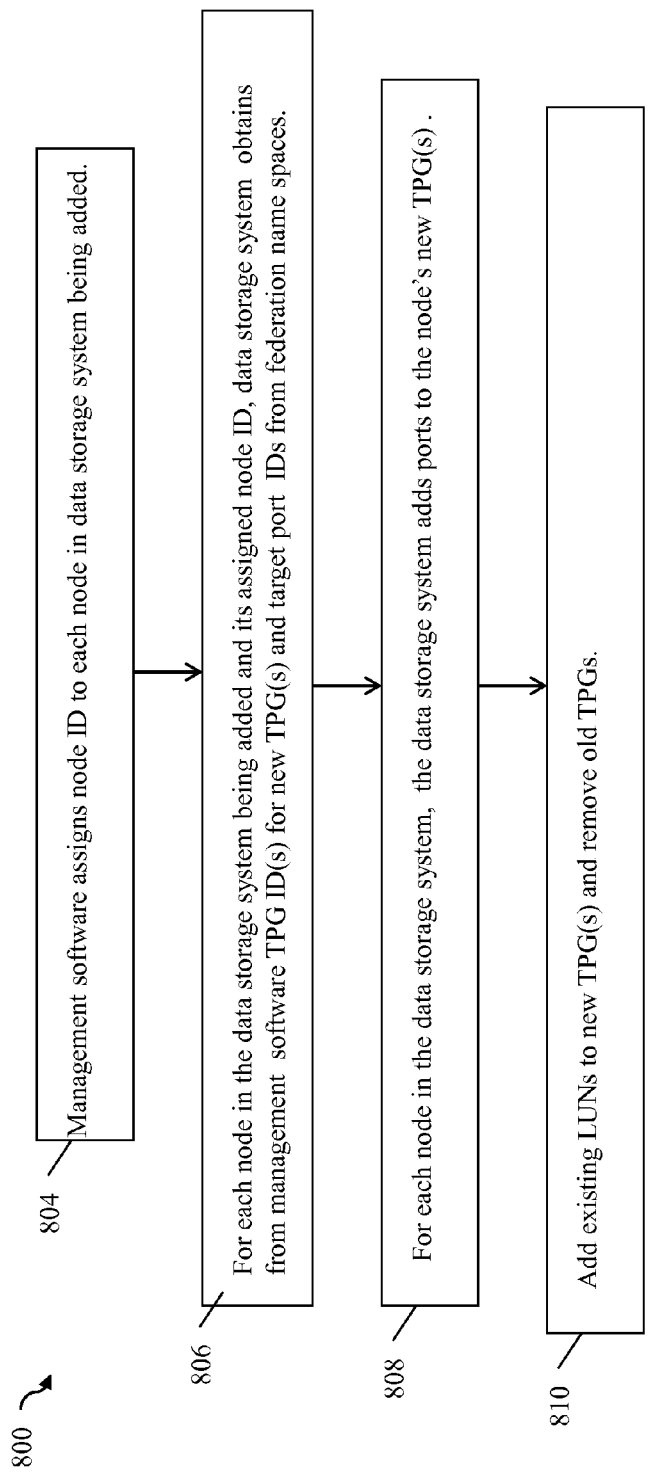

What will now be described in connection with FIGS. 10 and 11 are flowcharts of processing steps as may be performed in connection with particular uses of the techniques herein.

Referring to FIG. 10, shown is a flowchart of processing steps that may be performed in connection with creating a federation that may include one or more data storage systems, such as data storage arrays. In step 702, a data storage domain may be creating for the federation and the new data storage system may be added to this domain and the federation. In step 704, the management software assigns a node ID to each node in the new data storage system. At step 706, for each node in the new data storage system and its assigned node ID, the new data storage system obtains from the management software TPG ID(s) for one or more new TPG(s) and new target port IDs from federation name spaces. At step 708, for each node in the new data storage system, the new data storage system adds ports to the node's TPG(s). In step 710, the new data storage system is now ready for provisioning. For example, the physical storage devices of the new data storage system may be configured into LUNs and the LUNs may be made visible and accessible over desired target port(s) and TPG(s).

Referring to FIG. 11, shown is a flowchart of processing steps that may be performed in connection with adding a provisioned data storage system into the federation. Steps 804, 806 and 808 are respectively similar to steps 704, 706 and 708 of flowchart 700. In step 810, the LUNs existing on the data storage system may then be added to the new TPG(s) and removed from old or existing TPG(s) which are not part of the federation. In step 810, the old TPGs which are not part of the federation may be removed when the host or other client discovers and uses the new TPGs rather than the old TPGs.

What will now be described are techniques that may be used in connection with performing migration such as using a data storage system included in a federation as described herein. The migration techniques may be used in connection with any suitable use or application such as, for example, in connection with performing an upgrade or update to a data storage system whereby the data storage system (serving as the migration source) includes data that is migrated to another target data storage system (serving as the migration target) prior to performing the upgrade. The updating or upgrading may be performed with respect to software and/or hardware of the source data storage system. During the upgrade to the source data storage system, the copy of data on the target system may be used thereby providing the hosts or other clients continued access to the data in accordance with techniques herein. Upon completing the upgrade, the data may be migrated from the target data storage system back to the now upgraded source data storage system. As another exemplary use of the migration techniques, the migration may be performed in connection with replacing a data storage system with a second data storage system. In this manner, the migration may be performed using techniques herein to migrate data from the data storage system (as a migration source) to the second data storage system which is the target data storage system of the migration. Once the migration has completed, the original data storage system may be taken offline, decommissioned, have its physical storage devices re-provisioned, and the like.

In connection with exemplary embodiments described herein, the target data storage system to which the data is being migrated from a source data storage system may be included in a federation as described herein. The target data storage system included in a federation operating in accordance with techniques herein has the ability to take on an identity (e.g., WWN) of a LUN having its data stored on the source data storage system, import the LUN's data from the source data storage system which may not be a member of the federation, and serve as a proxy whereby the target data storage system receives data operations directed to the LUN. The data operations received by the target system may then be transmitted to the source data system through the receiving target data storage system during the migration. As described in following paragraphs, the target data storage system serving as a proxy during the migration allows the migration to be seamless and non-disruptive with respect to the host and its applications by providing the host with continuous access to the LUN's data during the migration process and then transparently cutting over to use the migrated copy of the LUN data on the target data storage system once the migration has completed.

In following paragraphs, provided is a first example of performing data migration from a source or donor data storage system to a target data storage system whereby the target data storage system is a member of the federation as also described herein.

Figure 12:
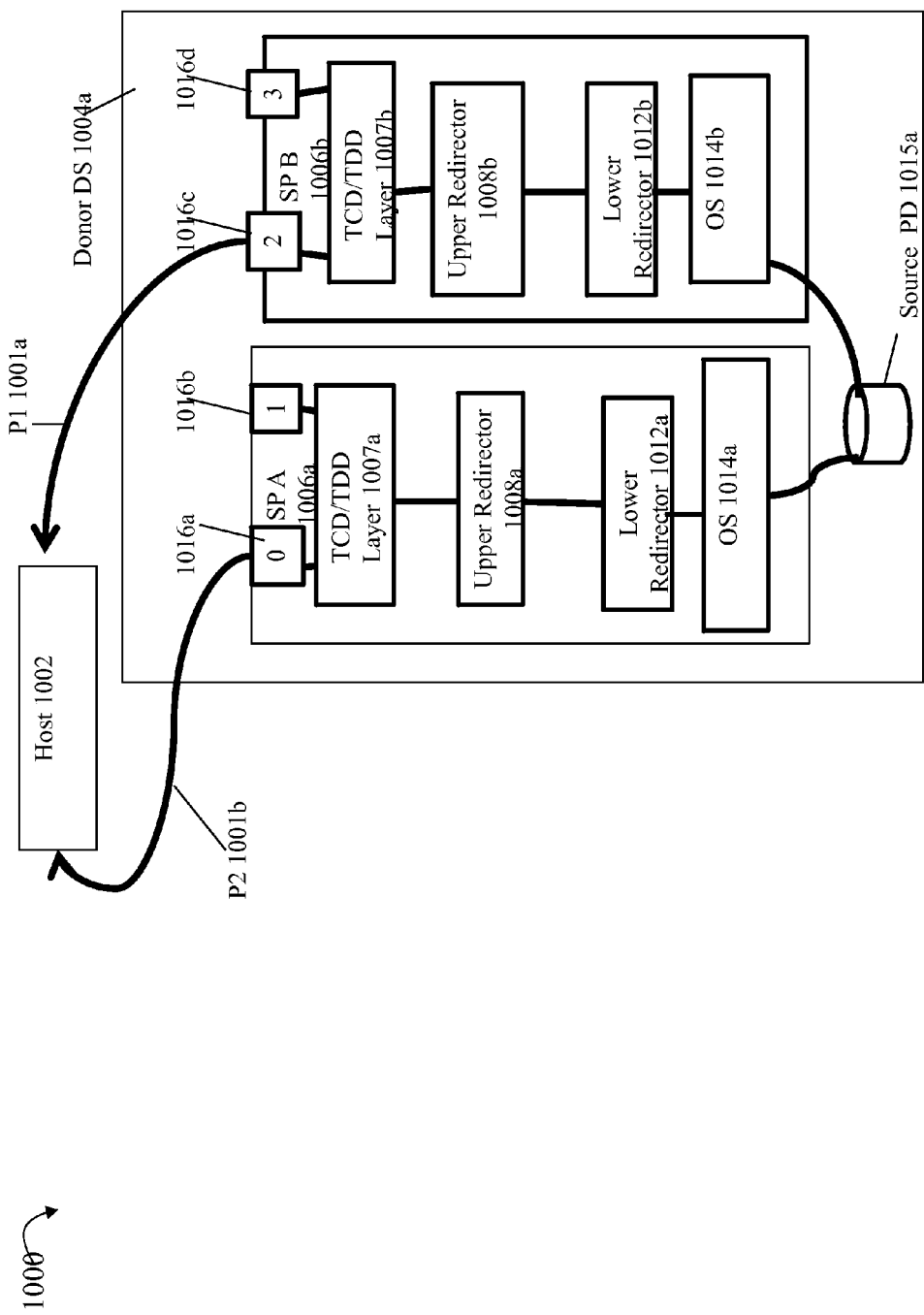
FIGS. 12, 13, 14, 15, 16, 17 and 18 are diagrams illustrating paths and data flow in connection with illustrating processing as may be perform in an embodiment in accordance with techniques herein.

Referring to FIG. 12, shown is an example 1000 illustrating components that may be included in an embodiment performing the migration techniques herein. The example 1000 illustrates a first step or starting point of the migration techniques. The example 1000 includes a host 1002 and a donor data storage system (DS) 1004a serving as the source of the data migration. The donor DS 1004a includes two SPs 1006a, 1006b. SP A 1006a includes target ports 1016a, 1016b and a first set of software layers 1007a, 1008a, 1012a and 1014a. The software layers of SP A 1006a may include other layers than those few as illustrated in FIG. 12 for simplicity. Different ones of the software layers may be included in the I/O path forming a runtime call frame stack when processing I/O operations. SP B 1006b includes target ports 1016c, 1016d and a second set of software layers 1007b, 1008b, 1012b and 1014b. SP A 1002a and SP B 1006b may include the same set of software layers so that SP A 1006a may provide the same services and processing as SP B 1006b, and vice versa. The target ports 1016a-d and other components of the donor DS 1004a may be as described elsewhere herein. In this particular example, the donor DS 1004a may not be a member of the federation and may be characterized, for example, a legacy data storage system as described herein having target port identifiers as illustrated. The port 1016a may have a target port identifier of 0. The port 1016b may have a target port identifier of 1. The port 1016c may have a target port identifier of 2. The port 1016d may have a target port identifier of 3.

With reference to SP A 1006a, the Target Class Driver and Target Disk Driver (TCD/TDD) layer 1007a generally provides SCSI target support. SP A 1006*a* may include a redirector driver having an upper redirector 1008*a* and a lower redirector 1012*a*. The redirectors 1008*a*, 1012*a* may perform processing in connection with I/O forwarding between SPs 1006*a*, 1006*b* for a variety of different purposes and uses some of which are described herein. Such I/O forwarding may be performed using internal SP communication connections within the data storage system 1004*a*. Although not illustrated, other layered drivers, such as in connection with providing snapshots, mirroring, migration, and other services or processing, may be placed between the upper redirector 1008*a* and the lower redirector 1012*a*. The layer 1014*a* may represent an operating system (OS) or operating environment layer such as FLARE™. Elements 1007*b*, 1008*b*, 1012*b*, and 1014*b* of SP B 1006*b* are similar, respectively, to 1007*a*, 1008*a*, 1012*a*, and 1014*a* of SP A 1006*a*. Element 1015*a* may represent a source physical drive or device (PD) storing the data of a LUN having a WWN. In this example, the LUN may be referred to as LUN A having its data stored on PD 1015*a*. LUN A's data on PD 1015*a* may be accessed by the host 1002 issuing I/O operations to the LUN A at ports 1016*a* and/or 1016*c*. Ports 1016*b*, 1016*d* may not be connected to the host 1002 and may therefore not be used to access data of LUN A in this example.

In a data storage system such as 1004*a* having multiple SPs, the SPs may have a concept of ownership with respect to a particular LUN in the data storage system. An SP that is deemed an owner of a LUN is the single SP that can perform an operation or I/O against that LUN. There may also be other operations, such as administrative operations, that can only be performed on the owning SP. In this particular example, LUN A may be visible to the host on paths P1 1001*a* and P2 1001*b*. However, path P1 may be active and path P2 may be passive. Consistent with description elsewhere herein, LUN A's data may be currently accessed using path P1 but not P2. In this manner, I/Os directed to LUN A may be accepted on port 2 of SP B 1006*b* whereby SP B 1006*b* may be the owner of LUN A. In the event of a first of the SPs failing, such as SP B 1006*b* failing, the other healthy SP (e.g., SP A 1006*a*) may takeover servicing I/Os as part of failover processing. In the case of a back-end failure on an SP that is currently the owner of a LUN, using the request forwarding feature such as in connection with ALUA, the I/O may be routed by the lower redirector of the owning SP to the lower redirector of the non-owning, peer SP. Thus, certain back end failures may be masked or transparent to the host. As will be described in following paragraphs, the lower redirector may also be used to redirect I/Os connection with migration techniques herein whereby the I/Os and associated data are proxied between source and target data storage systems.

It should be noted that particular components, such as the lower and upper redirectors as illustrated in the particular exemplary embodiment in FIG. 12 and others herein, are not required for use with the techniques herein. Rather, as will be appreciated by those skilled in the art, any suitable component and partitioning of functionality among such components in an embodiment may be used in connection with performing processing for the techniques herein.

In connection with the example 1000, the host 1002 may send i/Os directed to LUN A at port 1016*c*. The is then transmitted as follows on the I/O path including 1016*c*, 1007*b*, 1008*b*, 1012*b*, 1014*b*. Processing may be performed to retrieve data from 1015*a* for reads and to write data to 1015*a* for writes. Any data is returned along the same path to the host 1002 as the incoming data operation.

Figure 13:
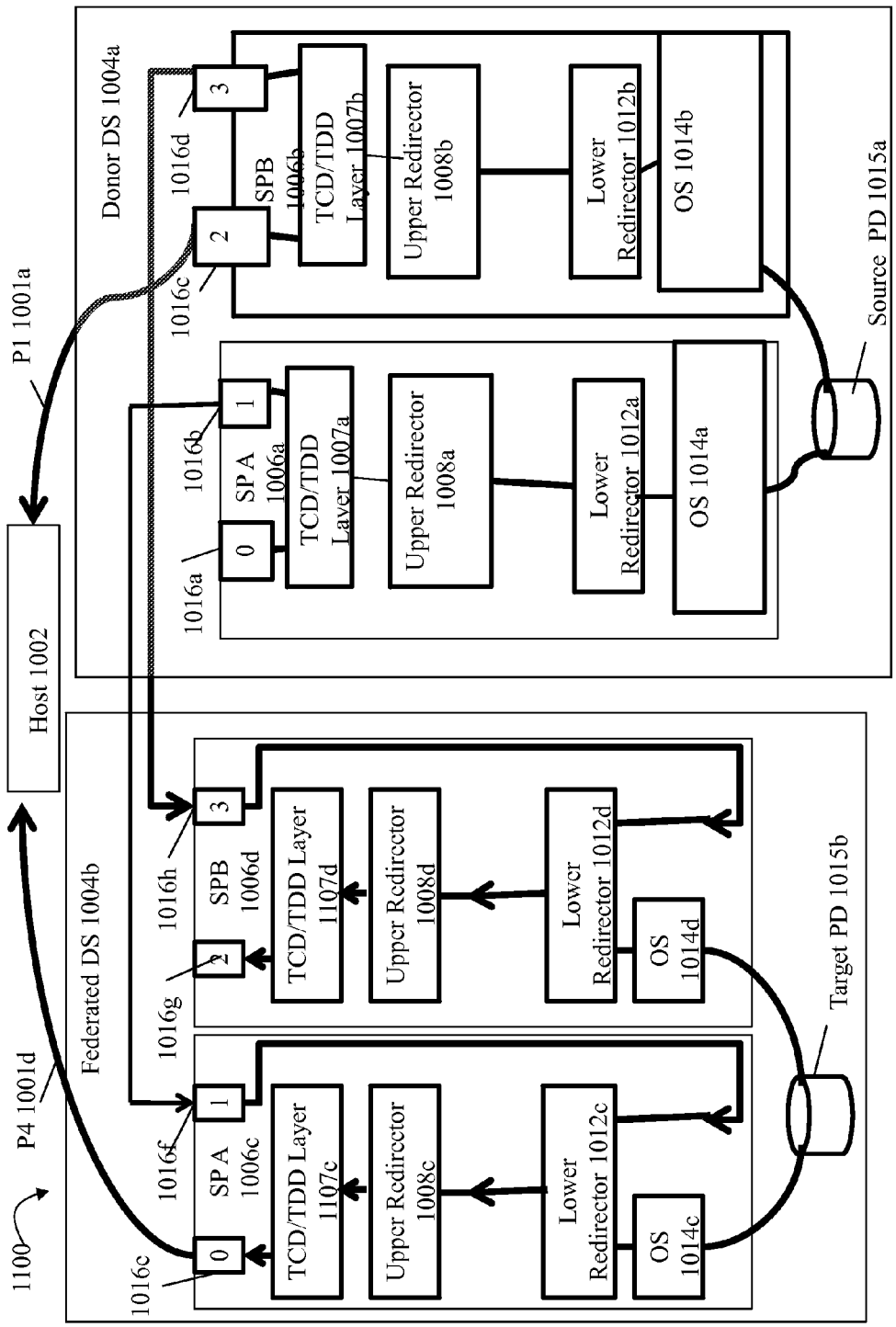

Referring now to FIG. 13, shown is an example 1100 illustrating components that may be used in connection with migration techniques herein. The example 1100 includes federated DS 1004*b* of a data storage federation as described herein. The DS 1004*b* is the target data storage system to which the data from source PD 1015*a* for LUN A will be migrated to target PD 1015*b*. The DS 1004*b* may include components and layers similar to those as described in connection with donor DS 1004*a*. The federated DS 1004*b* may include target ports 1016*e*-1016*h*, SPs 1006*c*, 1006*d*, software layers such as 1107*c*-*d*, 1008*c*-*d*, 1012*c*-*d*, and OS 1014*c*, *d*. The target ports 1016*e*-*h* of DS 1004*b* may be configured in this example to have the same target port IDs, respectively, as target ports 1016*a*-6 of DS 1004*a*. As a second step, the systems 1004*a* and 1004*b* may be interconnected as illustrated and the path P2 1001*b* may be replaced with path P4 1001*d*. Path 4 1001*d* is passive and path P1 1001*a* is active at this point. It should be noted that since the ports of the DSs 1004*b* and 1004*a* are configured to have the same port IDs, from the host's view point, path P4 1001*d* represents the same path and logical connections as path 2, 1001*b* since ports 1016*a* and 1016*e* are configured to have the same target port IDs. Thus, in this particular example, the host views paths 1001*b* and 1001*d* as logically the same paths having the same SCSI initiator and target port IDs even though the actual physical connection and ports have changed. The same LUN A may be exported by both DS 1004*b* over path P4 1001*d* and DS 1004*a* over path P1 1001*a*. However, in accordance with this exemplary illustration of an active-passive model, the host has recognized both paths P1 1001*a* and P4 100*d* to LUNA but only path P1 1001*a* is currently active or may be used to access LUN A's data of source PD 1015*a*. It should be noted that the TPG IDs and node IDs associated with SP A 1006*c* and SP B 1006*d* of federated DS 1004*b* may be the same, respectively, as the TPG IDs and node IDs associated with SP A 1006*a* and SP B 1006*b* of the donor DS 1004*a*.

As a third step in the processing, path P1 1001*a* may be set to the passive path state for accessing LUN A's data, and path P4 1001*d* may be set to the active path state for accessing LUN A's data. At this point, the host 1002 may issue I/Os to LUN A to access LUN A's data on source PD 1015*a*. The I/Os for LUN A may be received on path P4 1001*d* at port 1016*e* which is then forwarded along the I/O path represented by the data flow through 1016*e*, 1107*c*, 1008*c*, 1012*c*, 1016*f* (port of SP A of DS 1004*b*), 1016*b* (port of SP A of DS 1004*a*), 1007*a*, 1008*a*, 1012*a*, 1014*a*, and then to the source PD 1015*a*. Any data returned for I/Os may be returned along the same path in reverse order. At this third point in time, the foregoing is the I/O path used in connection with servicing I/Os directed to LUN A whereby the source PD 1015*a* includes the current copy of LUN A's data used. In this manner, the federated DS 1004*b* acts as a proxy of I/O directed to LUN A by forwarding the I/Os to the donor DS 1004*a*. Both read and write operations may use the same physical copy of data on source PD 1015*a* at this point in the migration process.

Figure 14:
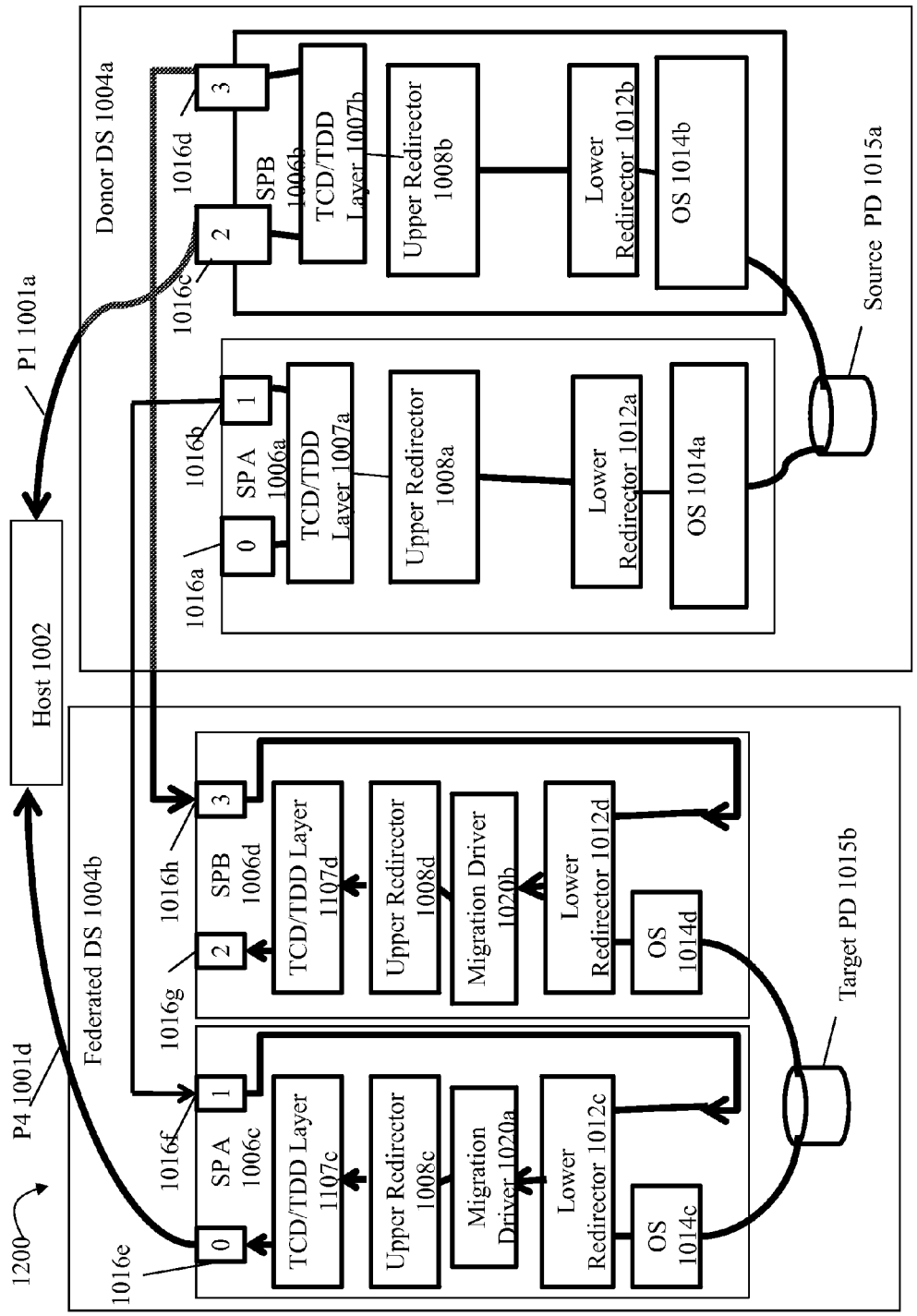

As a fourth step in the process, a migration driver may be introduced into the I/O stack and may be used in connection with controlling the migration of data using a data pull technique. With reference now to FIG. 14, migration driver 1020*a* is now included in the I/O path. Similarly, migration 1020*b* is included in SP B for redundancy and as may be used in connection with failover purposes such as in the event of SP A 1006*c* failing as described elsewhere herein in more detail. The migration driver 1020*a* may commence the migration processing to copy data from source PD 1015*a* to target PD 1015*b*. The migration driver 1012*a* may access the source PD 1015*a* through the following data flow path: 1020*a*, 1012*c*, 1012*c*, 1016*f* (port of SP A of DS 1004*b*), 1016*b* (port of SP A of DS 1004*a*), 1007*a*, 1008*a*, 1012*a*, 1014*a*, and then to the source PD 1015*a*. The data is then written out to the target PD 1015*b* by the migration driver 1020*a* through the following data flow path: 1020*a*, 1012*c*, 1014*c* and then to target PD 1015*b*. In connection with migration processing, the migration driver 1020*a* is performing processing to establish target PD 1015*b* as a mirror of source PD 1015*a* thereby providing for data synchronization between 1015*a*, 1015*b*. During the migration, I/Os directed to LUN A such as from host 1002 are also being serviced. Such processing of I/O servicing may also include processing performed by the migration driver 1020*a*. For example, the migration driver 1020*a* may decide whether to use data from source PD 1015*a* or target PD 1015*b* to service an I/O operation. In connection with servicing I/Os, reads can be serviced using the target PD 1015*b* if the requested data has been already migrated from 1015*a* to 1015*b*. Otherwise, the migration driver 1020*a* may obtain the requested data from 1015*a* on the donor DS 1004*a*. Additionally, once the migration driver 1020*a* has obtained the requested read data, the migration driver 1020*a* may then write this same data to target PD 1015*b* even if this results in migrating the read data out of a particular order in which the data would have otherwise been migrated to the 1015*b*. In some embodiments, the migration process may include performing first processing to copy the data from 1015*a* to 1015*b*. For example, the first processing may perform such copying in a sequential order as part of a background task. As such data is copied, the background task may track (such as in a tracking table or other structure) which portions of LUN A's data are migrated and which have yet to be migrated to PD 1015*b*. While the first processing is ongoing, second processing may be performed by the migration driver 1020*a* to service incoming I/O requests for LUN A data such as a read request. In connection with servicing this read request, a determination may be made by using the tracking table whether the requested read data is on PD 1015*b*. If so, the read may be serviced by accessing the requested data from PD 1015*b*. Otherwise, the requested read data is serviced by first accessing the data from PD 1015*a* and transmitting the requested data to migration driver 1020*a* over the path between 1004*b* and 1004*a* as described above. The requested read data is then used to both service the read I/O and also facilitate data migration in that the requested read data is also copied to the target PD 1015*b* and then marked as having been copied or migrated. In this manner, servicing the read operation may also provide for additionally migrating data "out of order" with respect to the normal migration order as performed by the above-mentioned first processing. In response to the federated DS 1004*b* receiving a write operation for LUN A over path 4 1001*d*, the migration driver 1012*a* may write the data to both the target PD 1015*b* and the source PD 1015*a* and also note this newly written data as having been migrated since the newly written data is the most up to date. The data may be written to the source PD 1015*a* and the target PD 1015*b* using the data paths as described above.

Figure 14A:
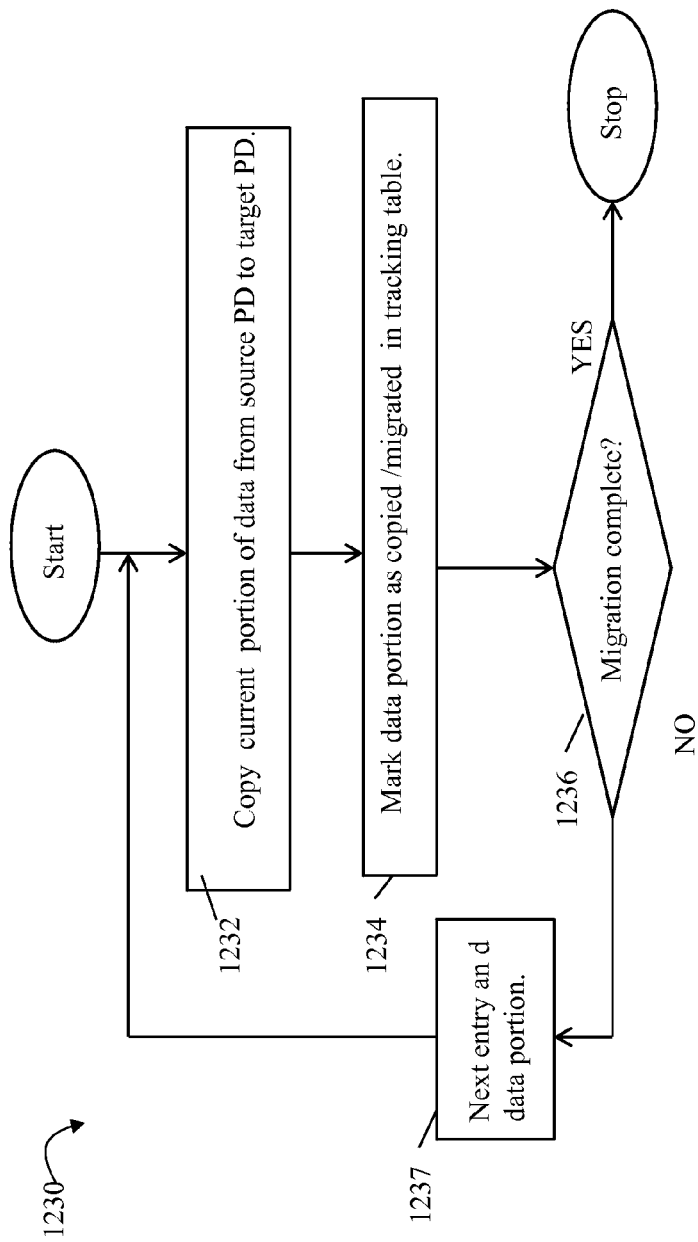

Referring to FIG. 14A, shown is a flowchart of processing steps as may be performed by migration processing to migrate data from the source PD 1015*a* to the target PD 1015*b*. The flowchart 1230 summarizes the first processing described above as may be performed by a background task. The processing may operate on data portions of any suitable size and may be copied in any suitable order. For example, processing of 1230 may copy data and metadata for LUN A in a sequential order. In this manner, a table may be maintained which includes an entry for each data portion of LUN A to be copied. Processing may traverse this table, such as in a linear manner from top to bottom, and may maintain a pointer or counter as to the current entry and data portion being migrated. At step 1232, the current portion of data may be copied from the source to the target PD. At step 1234, the data portion copied in step 1234 is denoted or marked in the table as having been migrated. At step 1236, a determination is made as to whether migration of all LUN A data and metadata has completed. If step 1236 evaluates to yes, processing stops. Otherwise, step 1236 proceeds to the step 1237 to advance to the next entry in the table for the next data portion to be migrated and then step 1232.

Figure 14B:
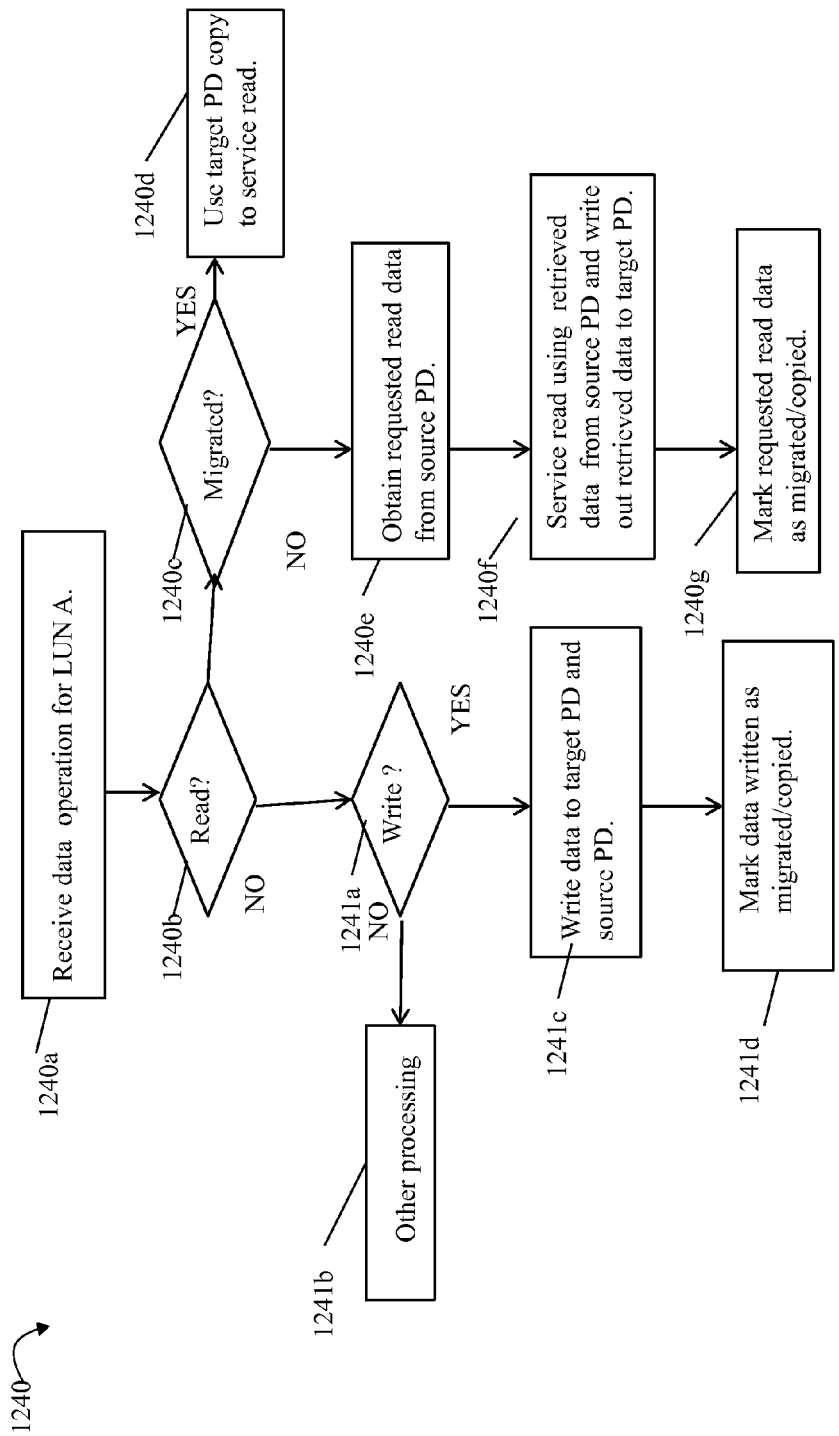

Referring to FIG. 14B, shown is a flowchart of processing steps as may be performed during migration to service data operations for LUN A received by the target or federated DS 1004*b*. The flowchart 1240 summarizes the second processing described above. At step 1240*a*, a data operation is received by the federated DS 1004*b* for LUN A. At step 1240*b*, a determination is made as to whether the data operation is a read operation. If step 1240*b* evaluates to yes, control proceeds to step 1240*c* where a determination is made as to whether the requested data has been migrated. If yes, control proceeds to step 1240*d* to service the read operation using data from the target PD. If step 1240*c* evaluates to no, control proceeds to step 1240*e* where the requested read data is retrieved from the source PD on the donor DS 1004*a*. At step 1240*f*, the data retrieved from the source PD in step 1204*e* is used to service the read operation and also written out to the target PD of the federated DS 1004*b*. At step 1204*g*, the requested read data written out to the target PD is marked as migrated or copied.

If step 1240*b* evaluates to no indicating that the data operation is not a read operation, control proceeds to step 1241*a* where a determination is made as to whether the operation is a write operation. If step 1241*a* evaluates to yes, control proceeds to step 1241*c* to write the data to the target PD and also the source PD. In step 1241*d*, the data written to the target PD is marked as copied or migrated. If step 1241*a* evaluates to no, control proceeds to step 1241*b* to perform other processing suitable for the data operation.

With reference back to FIG. 14, it should be noted that during the migration process, a single point of failure may be tolerated by continuing to also propagate and maintain the source PD 1015*a* as a mirrored copy of the target PD 1015*b* when writes are issued to LUN A during the migration process. In this manner, if there is a problem with the federated DS 1004*b* being unable to service I/O operations for LUN A (e.g., such as the federated DS 1004*b* being unavailable to the host), path P 1 1001*a* may assume the role of the active path thereby providing access to the source PD 1015*a* through the donor DS 1004*a*. In this case, there may be writes to the source PD 1015*a* while the federated DS 1004*b* is unavailable. Migration processing may be restarted once the federated DS 1004*b* is back on line and such migration processing starts from the beginning since the information maintained in the tracking table regarding what data portions between PDs 1015*a* and 1015*b* are synchronized may be out of date due to the writes to LUN A since the target DS 1004*b* has been offline.

With reference back again to FIG. 14, assume the migration processing has now successfully completed. As a fifth step with reference now to FIG. 15, the migration driver 1020*a* may now be removed from the I/O stack on the federated DS 1004*b* (and similarly migration driver 1020*b* may also be removed). Additionally, the interconnections between the data storage systems 1004*a* and 1004*b* may be removed and path P1 1001*a* may be replaced with path P3 1001*c*. At this point, path 3 1001*c* may be the passive path and path 4 1001*d* may be the active path for LUN A whereby data operations from the host 1002 may be serviced using solely the data for LUN A as migrated to the target PD 1015*b*. Since the port IDs of both the donor DS 1004 and the federated DS 1004*b* are similarly configured as described above, the path P3 1001*c* appears to the host as the same logical SCSI path (with the same initiator and target port ID) as path P1 1001*a*. In a sixth step, path P4 1001*d* may be made the active path and path P3 1001*c* may be designated as the passive path. At this point, from the host's perspective, LUN A is accessible through the same two SCSI-based paths as in FIG. 12 prior to the migration (e.g., where each path that is the same may be defined in terms of having the same initiator and target port IDs).

It should be noted that in connection with the foregoing, there may be a short time period where there is no secondary or passive path to access LUN A during the changeover (e.g., in the fifth step above) of the passive path from path 1 1001*a* of SP B/Donor DS to path 3 1001*c* to SP B of the federated DS. Thus, in order to provide high availability of LUN A's data to the host, a variation to the foregoing ordering of steps may be to perform the changeover of the passive path P1 1001*a* (to SP B of the Donor DS) to path 3 1001*c* (to SP B of the Federated DS) prior to completing the migration.

Figure 15:
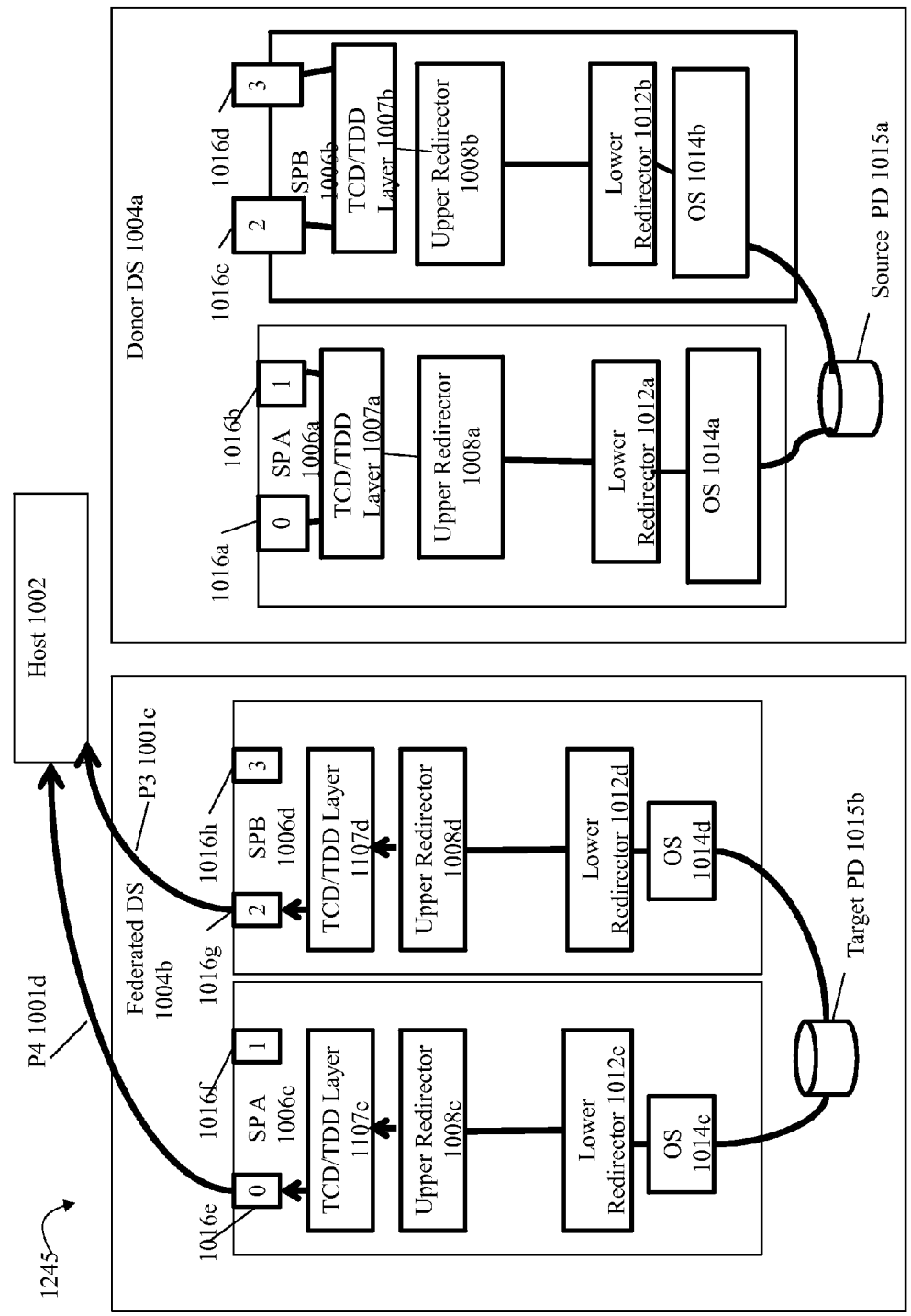
Figure 15A:
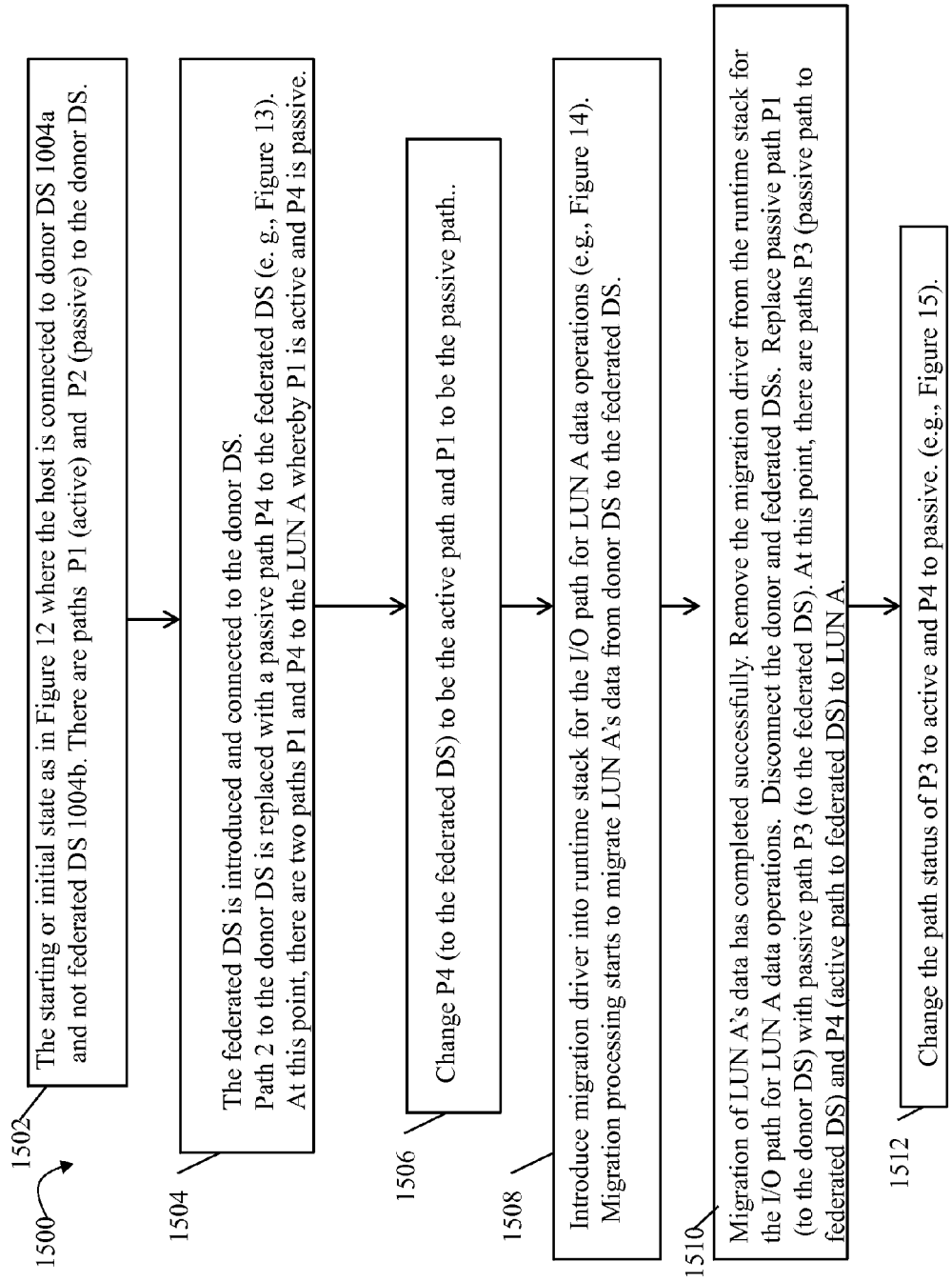

Processing as described above may be summarized as including the following steps with reference now to FIG. 15A. At step 1502 (corresponding to a first step described above), the starting or initial state as in FIG. 12 where the host is connected to donor DS 1004*a* and not federated DS 1004*b*. There are paths P1 (active) and P2 (passive) to the donor DS. At step 1504, (corresponding to the second step described above), the federated DS is introduced and connected to the donor DS. Path 2 to the donor DS is replaced with a passive path P4 to the federated DS (e.g., FIG. 13). At this point, there are two paths P1 and P4 to the LUN A whereby P1 is active and P4 is passive. At step 1506, (corresponding to the third step described above), path P4 (to the federated DS) is made the active path and P1 is made the passive path. At step 1508 (corresponding to the fourth step described above), the migration driver is introduced into the runtime stack on the federated DS for the I/O path for LUN A data operations (e.g., FIG. 14). Migration processing starts to migrate LUN A's data from the donor DS to the federated DS. At step 1510, (corresponding to the fifth step described above), migration of LUN A's data has completed successfully. The migration driver is removed from the runtime stack for the I/O path for LUN A data operations. The donor and federated DSs are disconnected. Passive path P1 (to the donor DS) is replaced with passive path P3 (to the federated DS). At this point, there are paths P3 (passive path to federated DS) and P4 (active path to federated DS) to LUN A. At step 1512 (corresponding to the sixth step described above), the path status of P3 is changed to active and P4 to passive. (e.g., FIG. 15).

In order to provide high availability, the following variation may be performed introducing a new step (step 1507 in FIG. 15B) between steps 1506 and 1508 to perform a passive path changeover from the donor DS to the target DS prior to starting migration processing (e.g., rather than performing this as part of the fifth processing step in 1510). With reference now to FIG. 15B, processing is illustrated for the variation to the processing of FIG. 15A. Steps 1502, 1504, and 1506 are as described above. At step 1507, passive path P1 (to port 2 1016*c* of the donor DS) is replace with passive path P3 (to port 2 1016*g* of the federated DS). At this point, there are paths P3 (passive path to federated DS) and P4 (active path to federated DS) to LUN A. Step 1508 may performed as described above. Step 1511 replaces step 1510 of FIG. 15A. Step 1511 is the same as 1510 with the difference that the processing now performed at step 1507 is removed from 1511. Step 1512 may be performed as described above.

In this variation including step 1507, if SPA 1006*c* of the federated DS fails but the federated DS is otherwise up and running, the path P3 to port 2 1016*g* (to SP B 1006*d* of the federated DS 1004*b*) may be made the new active path. In this case, the migration may continue with migration driver 1020*b* resuming from the point in the migration at which migration driver 1020*a* ended with the failure of SP A 1006*c*. It should be noted that as will be appreciated by those skilled in the art, sufficient migration state information, such as the tracking table, may be persistently stored and communicated or shared between SP A 1006*c* and SP B 1006*d* to provide for migration driver 1020*b* resuming the migration from the above-mentioned point of failure. With reference back to FIG. 14, in this case, I/O received for LUN A on path P3 to port 1016*g* may be forwarded to migration driver 1020*b*. Driver 1020*b* may access data of target PD 1015*b* through 1012*d* and 1014*d*. Driver 1020*b* may also access data and forward I/O requests during the migration to donor DS 1004*a* over the following path: 1012*b*, 1012*d*, 1016*h* (port 3 of SP B 1006*d* of federated DS 1004*b*), 1016*d* (port 3 of SP B of donor DS 1004*a*), 1007*b*, 1008*b*, 1012*b*, OS 1014*b* and then to source PD 1015*a*. Thus, the migration driver 1020*b* may continue with migration processing as described above for 1020*a*. In this manner, the path P3 may be used as a replacement for passive path P1 at a point in time in the migration processing as noted above.

What will now be described is another second embodiment in accordance with the migration techniques herein.

Figure 16:
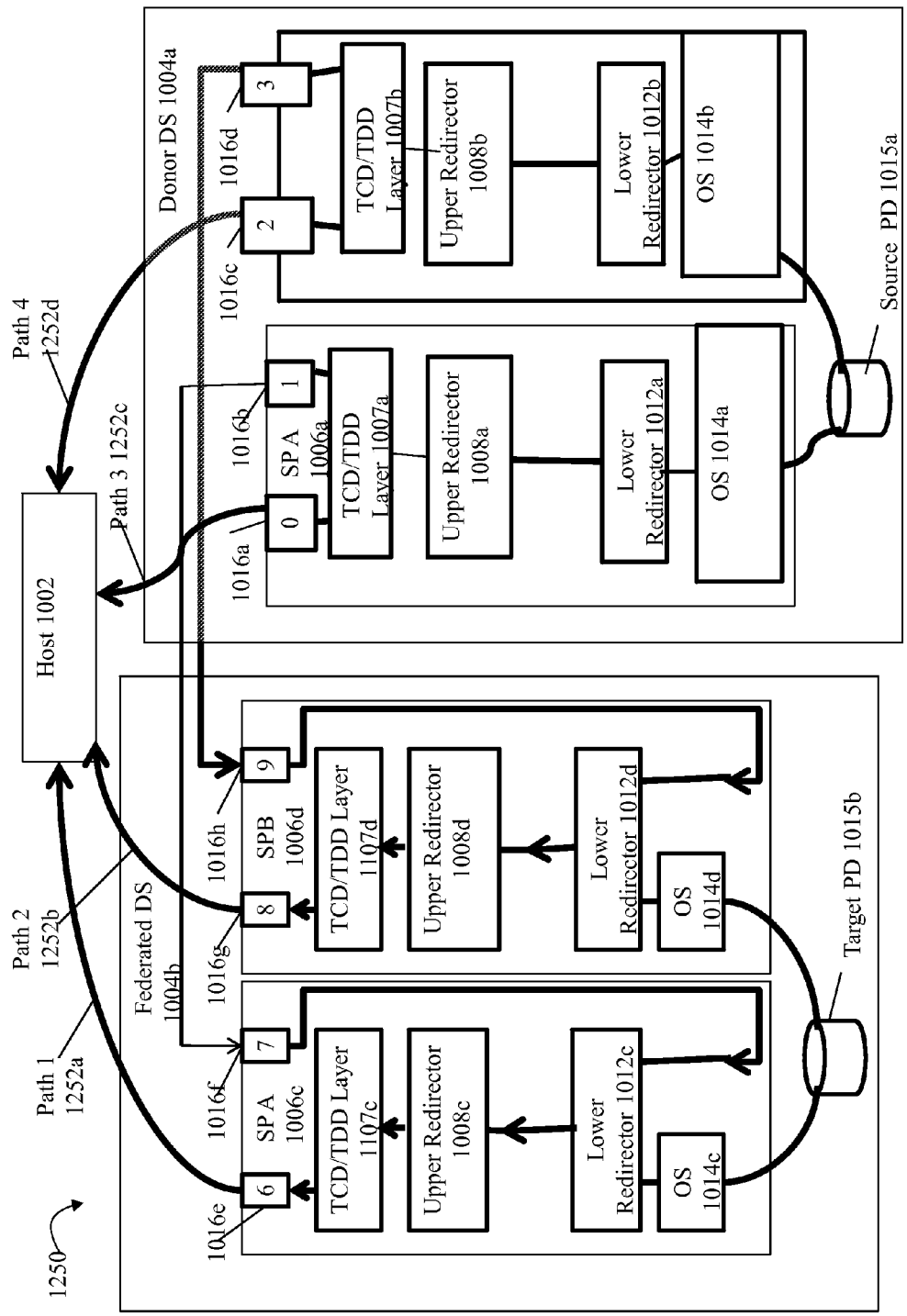

Referring now to FIG. 16, shown is an example of a different configuration for the federated DS 1004*b* as may be used as the target data storage system with respect to the migration processing described above. In connection with this second embodiment, the components are as described above with the difference that the federated DS 1004*b* may be configured to have target port IDs, TPG IDs and node IDs which are different from those of the donor DS 1004*a* (e.g., port 1016*e* has port ID 6, port 1016*f* has port ID 7, port 1016*g* has port ID 8, and port 1016*h* has port ID 9). Additionally, the migration processing as described in following paragraphs may use 4 paths or connections 1252*a*-1252*d* over which LUN A is exposed or exported to the host 1002 rather than two paths as described above. In this manner the host may now recognize 4 paths 1252*a*-*d* to the same LUN A whereby one of these 4 paths, such as 1252*d*, may be active and the remaining 3 paths 1252*a*-*c* may be passive. FIG. 16 may represent the point in processing similar to FIG. 13 whereby the two DSs 1004*a* and 1004*b* are interconnected and active and passive paths between the host 1002 and the DSs 1004*a* and 1004*b* are established. However, migration processing has not yet commenced. FIG. 16 may represent results of performing a first processing step in this second embodiment that includes establishing paths 1252*a*, 1252*b* to the federated DS 1004*b* and interconnecting the DSs 1004*a*, 1004*b*.

As a second step in the processing, path 1 1252*a* may be made the active path for LUN A with the remaining 3 paths designated as passive paths for LUN A.

Figure 17:
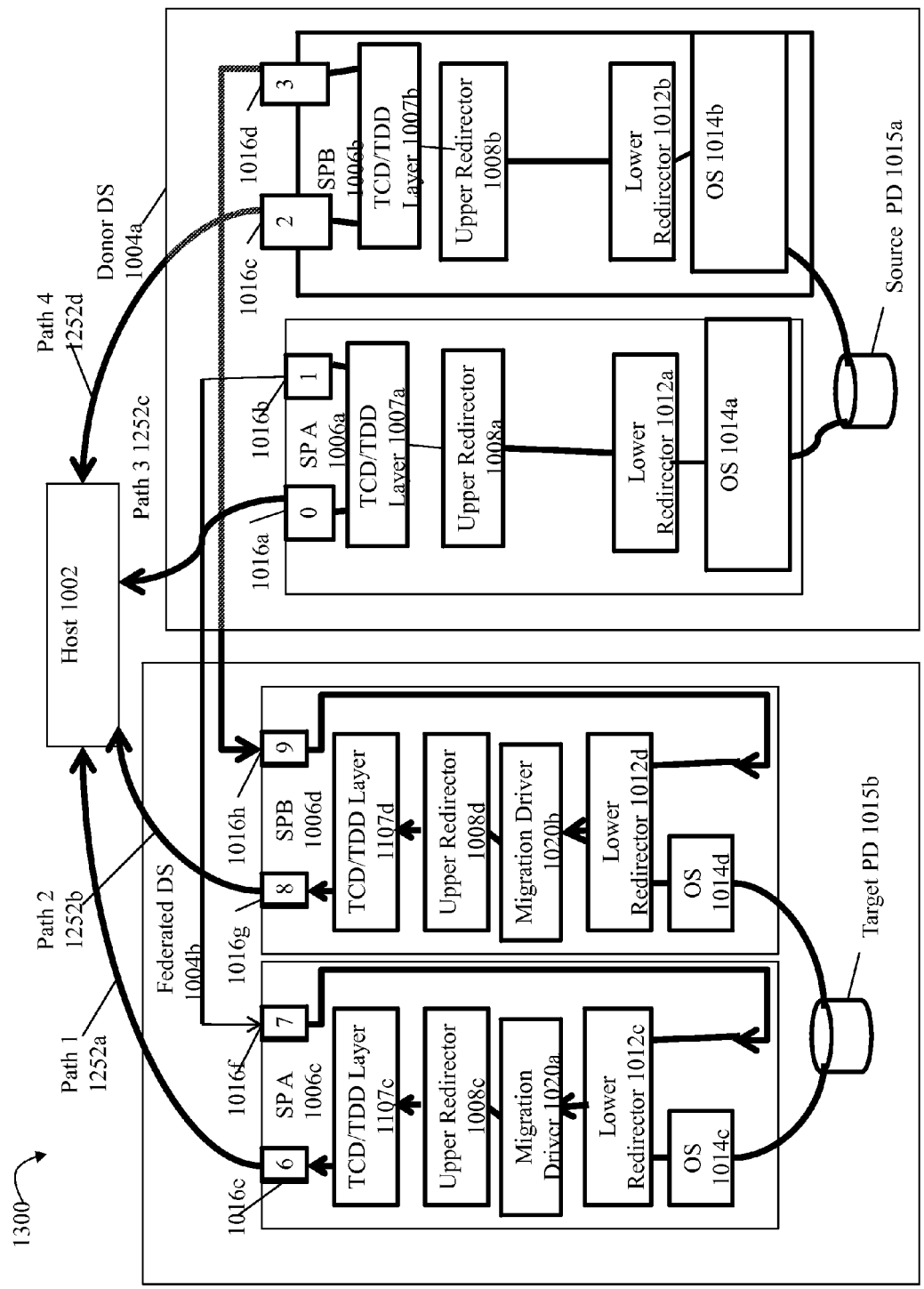

As a third step with reference to FIG. 17, the migration drivers 1020*a* and 1012*b* may be introduced into the I/O paths and migration processing may be started. The migration driver 1020*a* may control the migration processing as described above providing for migrating the data from source PD 1015*a* to target PD 1015*b* while also servicing I/Os for LUN A received on active path 1 1252*a*. In the event of a failure of SP A 1006*c* during the migration (prior to completing the migration processing), the passive path 1252*b* may become the new active path for LUN A data operations and the migration driver 1020*b* may proceed or resume with the migration processing from the point at which migration driver 1020*a* stopped due to the failure of SP A.

Figure 18:
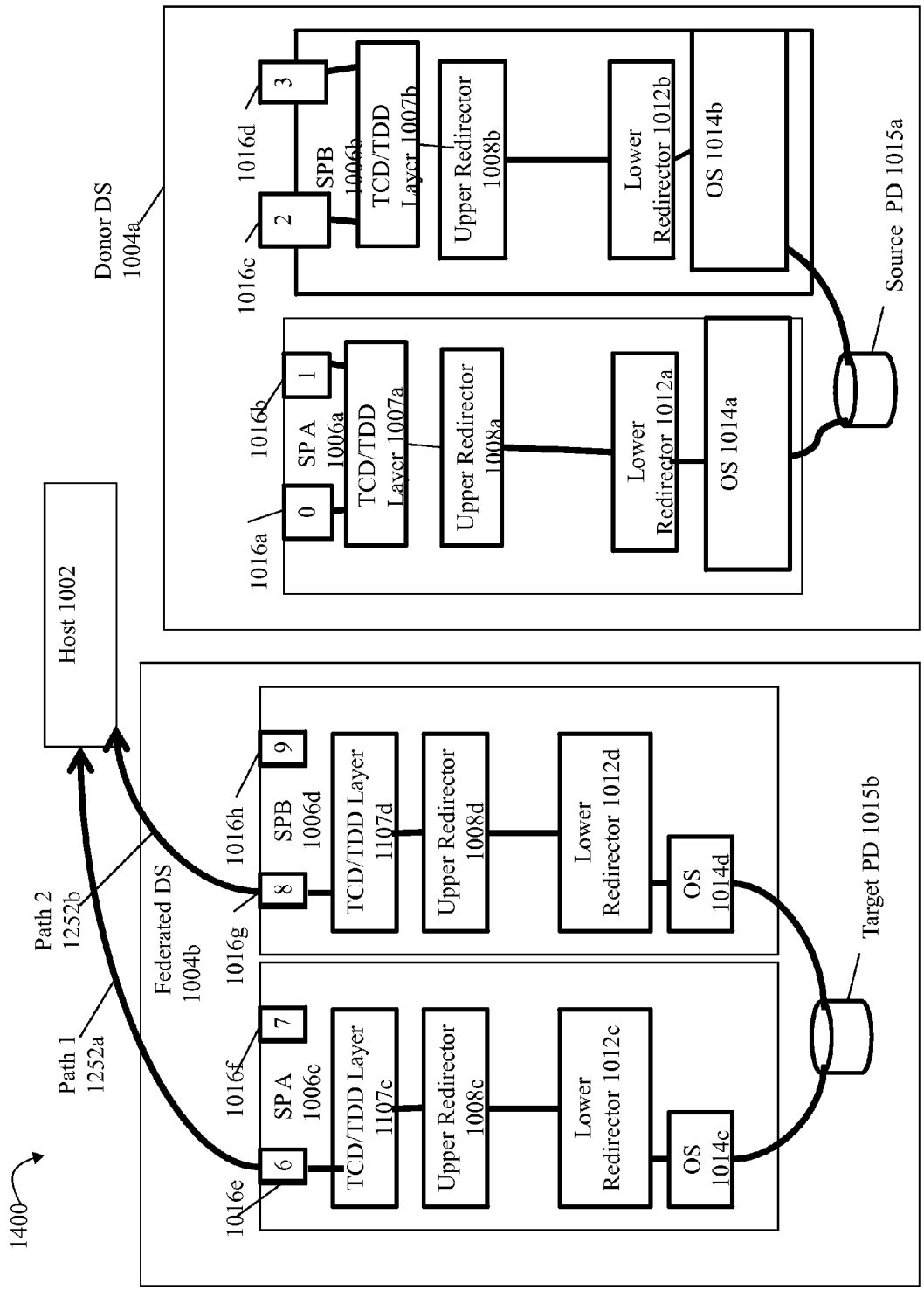

As a fourth step after migration has completed, reference is now made to FIG. 18. In the example 1400, the paths 1252*c* and 1252*d* between to the donor DS 1004*a* and the host 1002 may be removed and the interconnections between the federated DS 1004*b* and donor DS 1004*a* may be removed. All I/O operations from the host 1002 may be serviced using the migrated copy of the data on target PD 1015*b*.

Figure 19:
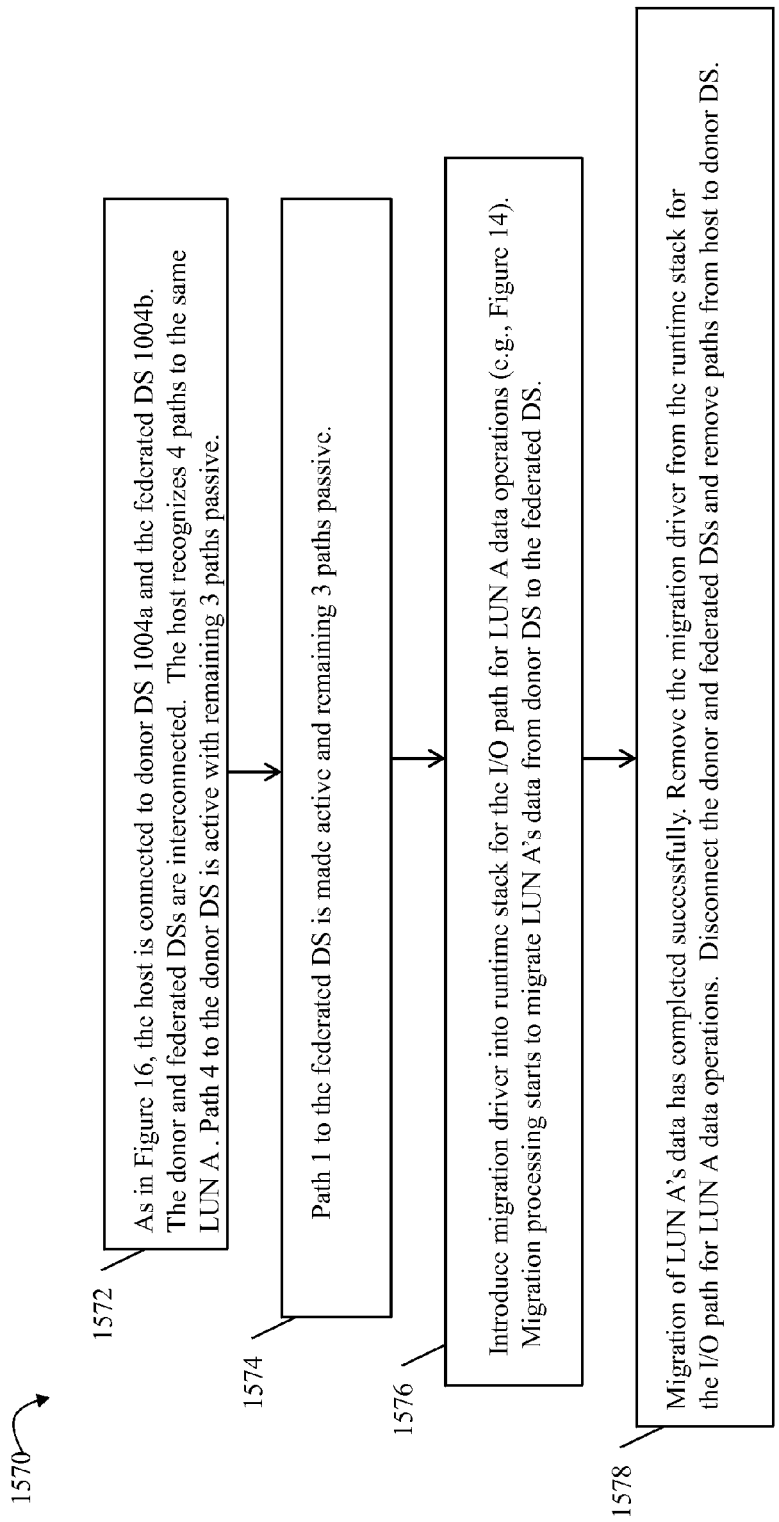

Referring to FIG. 19, shown is a flowchart of processing steps as may be performed in an embodiment in accordance with techniques herein. The flowchart 1570 summarizes processing described above with the second embodiment. At step 1572 (corresponding to the first step of the second embodiment described), as in FIG. 16, the host is connected to donor DS 1004*a* and the federated DS 1004*b*. The donor and federated DSs are interconnected. The host recognizes 4 paths to the same LUN A (2 paths 1252*c, d*) between the host and donor DS and 2 paths (1252*a, b*) between the host and federated DS). Path 4 to the donor DS is active with the remaining 3 paths passive. At 1574, (corresponding to the second step of the second embodiment described above), path 1 to the federated DS is made active and the remaining 3 paths designated as passive. At step 1576, the migration driver is introduced into the runtime stack for the I/O path for LUN A data operations on the federated DS. Migration processing start to migrate LUN A's data from the donor DS to the federated DS. In step 1578, the migration of LUN A's data to the federated DS has completed successful. The migration driver is removed from the I/O path for LUN A data operations on the federated DS. The donor and federated DSs may be disconnected and the paths from the host to the donor DS removed.

In connection with the embodiments described herein, the donor DS is illustrated as not being part of the federation. It should be noted that the donor DS, as the migration source system, may be included in the same federation as the federated DS, as the migration target system, if both the source and target systems are appropriately configured in accordance with the federation namespaces as described herein.

As another advantage of the migration techniques herein, the physical devices or drives of the target data storage system may have physical attributes or characteristics which are very different from those of the source data storage system thereby providing for decoupling attributes of the source and target system such as, for example, those of the physical drives (e.g., source and target physical drives may have different performance characteristics), and those related to LUN attributes (e.g., whether the LUN stores data for a thin or virtually provisioned logical device, the particular RAID protection level and configuration). As another example, an embodiment may move data from one source physical drive of a first technology to another target physical drive of a different technology such as in connection with "upgrading" an existing drive with a new drive of a higher performance classification, or more generally moving data between drives having different technologies (e.g., move data from a rotating ATA disk drive to a rotating fibre channel (FC) disk drive, or move data from an FC disk drive to a flash memory-based drive). Thus, if the target system is replacing the source system, the migration techniques herein used in connection with migrating data of one or more LUNs to a target system without requiring use of complex algorithms for data and metadata conversion.

The migration techniques described herein may be used in connection with any suitable application. For example, the migration techniques herein may be used in connection with replacing the source system with the target system that may be a newer data storage system. After the migration completes, the source data storage system may be re-provisioned or decommissioned. As another example, the migration techniques herein may be used when performing an upgrade to the source system whereby the data may be temporarily moved to the target system. Once the source system upgrade is completed, the data may be migrated back to the upgraded source system. Such migration of data back to the source system may also be performed using the techniques herein whereby the data is now copied from the target to the source.

In connection with techniques herein, migration processing may be performed providing a high availability. For example, in connection with FIG. 15A processing, the host may be provided with continued access to LUN A's data using a path to the donor DS. In connection with FIG. 15B processing, a failure of SP A of the federated DS results in using a second path to the SP B of the federated DS whereby the migration processing is allowed to continue while also providing the host with continuous access to LUN A's data.

The migration processing is performed with a migration driver of the target data storage system controlling the migration by using a data "pull" technique (e.g., migration runs on target which pulls or copies data from the source/Donor DS). Additionally, data operations from the host directed to the LUN are proxied through the target system while the migration is ongoing such as if the target system cannot service the request using data for the LUN that has already been migrated.

With reference back to the particular example described above illustrating migration techniques herein, the starting configuration state such as in FIG. 12 and the ending configuration state such as in FIG. 15 may be characterized as active-passive whereby the host recognizes two different paths to the same LUN but one of the two paths is active and the other is passive. As will be appreciated by those skilled in the art, techniques herein may be performed with respect to other desirable starting and/or ending states such as active-active whereby both such paths are active providing access to the same LUN's data. Furthermore, such paths may be provided by ports of the same data storage system, as in FIGS. 12 and 15, or they may be provided by different data storage systems. For example, two data storage systems may be providing access to the same LUN over two active paths—one such active path provided by each of the two data storage systems—at a first point in time. One of the two systems may need to be upgraded or replaced with another new system. Assume a first of the two systems is being upgraded and includes the PD(s) for the LUN's data. The migration techniques herein may be used to migrate the data from the first system to the second system. During the time of the upgrade, the first system being upgraded may have its path to the LUN set to the passive state while the path for the LUN to the second system remains active. After the upgrade, the first system which was just upgraded may have the path to the LUN, as well as the state associated with other paths and entities of the first system, set from passive back to the active state. More generally, there may be more than two paths to the same LUN provided by more than two data storage systems. Such variations will be readily appreciated by those skilled in the art based on the description provided herein.

An embodiment may implement the techniques herein using code executed by a processor. For example, an embodiment may implement the techniques herein using code which is executed by a processor of the data storage system, management system, or more generally, any computer system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of migrating data comprising:
   providing a source data storage system including a source device and a target data storage system including a target device;
   providing a passive path and an active path for a host to access data of a logical device,
   wherein the host recognizes the passive path and the active path as paths to the logical device,
   the passive path is between the host and the source data storage system, and the active path is between the host and the target data storage system, the active path being used in connection with proxying at least some requests which are requests to perform I/O (input/output) operations directed to the logical device and which are received at the target data storage system from the host, wherein said at least some requests are proxied through the target data storage system to the source data storage system while migrating data for the logical device from the source device to the target device; and
   performing said migrating to migrate data for the logical device from the source device to the target device, wherein said migrating is controlled by a migration module executing on the target data storage system that copies data from the source device to the target device and wherein during said migrating, I/O operations from the host directed to said logical device are sent over said active path to the target data storage system, wherein said target data storage system is included in a data storage federation and the source data storage system is not included in the data storage federation, the data storage federation including a plurality of data storage systems using at least one federation-wide namespace wherein each identifier in said one federation-wide namespace is unique across the data storage federation.

2. The method of claim 1, wherein the active path includes a first portion from an initiator port of the host to a target port of the target data storage system and data of the source device is accessed using a connection from the target data storage system to the source data storage system.

3. The method of claim 2, wherein the connection from the target data storage system to the source data storage system is from a second port of the target data storage system to a third port of the source data storage system.

4. The method of claim 1, wherein the logical device has a first device identifier.

5. The method of claim 4, wherein the first device identifier is a globally unique world wide name uniquely identifying the logical device from other logical devices.

6. The method of claim 4, wherein the host is provided with two additional passive paths to the logical device.

7. The method of claim 6, wherein the active path, the passive path, and the two additional passive paths are recognized paths over which the logical device is visible and wherein data of the logical device is accessible to the host over the active path and not accessible to the host over any of the passive path and the two additional passive paths.

8. The method of claim 1, wherein the active path is between a port of the host to a first target port of first node of the target data storage system, said first node including a plurality of modules, said plurality of modules including said migration module, and the method further comprising:
   providing a second passive path from the host to the target data storage system, said second passive path being between the host and a second target port of a second node of the target data storage system, said second node including a second set of said modules.

9. The method of claim 8, wherein the active path is a first path having an active status with respect to the logical device indicating that data of the logical device is accessible over the first path, and wherein the passive path is a second path having a passive status indicating that the second path is a recognized path by the host and that data of the logical device is not accessible over the second path.

10. The method of claim 9, wherein if data of the logical device is not accessible to the host over the first path, failover processing is performed which includes setting the first path to the passive status and the second path to the active status.

11. The method of claim 10, wherein when the second path is set to the active status, the migration module of the second set of the second node of the target data storage system controls migration of data from the source device to the target device, and wherein otherwise when the first path is set to the active status, the migration module of the plurality of modules of the first node of the target data storage system controls migration of data from the source device to the target device.

12. The method of claim 1, wherein the source data storage system is configured to use a first set of node identifiers, a first set of target port identifiers and a first set of target port group identifiers, and the target data storage system is configured to use the first set of node identifiers, the first set of target port identifiers and the first set of target port group identifiers.

13. The method of claim 1, wherein the target data storage system replaces the source data storage system and the method includes disconnecting the source data storage system from the target data storage system, wherein the method further includes performing any of: decommissioning the source data storage system and reprovisioning storage of the source data storage system.

14. The method of claim 1, further comprising:
   upgrading the source data storage system after migration of data from the source device to the target device has completed; and
   after completing said upgrading of the source data storage system, migrating data from the target device to any of the source device and another device of the source data storage system.

15. The method of claim 1, wherein the source data storage system is replaced with a new data storage system after migration of data from the source device to the target device has completed, and wherein data is migrated from the target device to another device of the new data storage system, said another device presented to the host as having the logical device identifier.

16. The method of claim 7 wherein each of the active path, the passive path and the two additional passive paths include a different target port having a different target port identifier.

17. The method of claim 1, wherein said active path is a first path to the logical device having an active status whereby the first path is recognized by the host and can be used to access data of the logical device and said passive path is a second path to the logical device having a passive status whereby the second path is recognized by the host and cannot be used to access data of the logical device, and wherein prior to performing said migrating and prior to providing said passive path and said active path, said first path and said second path both have said active status, and after said migrating has completed, said first path and said second path both have said active status.

18. A system for migrating data comprising:
a source data storage system including a source device;
a target data storage system including a target device;
a host, wherein the host recognizes two paths to access data of a logical device, a first of the two paths being a passive path to the logical device and the other of the two paths being a second paths that is active path for the host to access data of the logical device, wherein the passive path is between the host and the source data storage system, and the active path is between the host and the target data storage system, the active path being used in connection with proxying at least some requests which are requests to perform I/O (input/output) operations directed to the logical device and which are received at the target data storage system from the host, wherein said at least some requests are proxied through the target data storage system to the source data storage system while migrating data for the logical device from the source device to the target device; and
a non-transitory computer readable medium in the target system, wherein the computer readable medium comprises code stored thereon that performs said migrating to migrate data of the logical device from the source device to the target device and wherein during said migrating, I/O operations from the host directed to said logical device are sent over said active path to the target data storage system, wherein said target data storage system is included in a data storage federation and the source data storage system is not included in the data storage federation, the data storage federation including a plurality of data storage systems using at least one federation-wide namespace wherein each identifier in said one federation-wide namespace is unique across the data storage federation.

19. A non-transitory computer readable medium comprising code stored thereon for migrating data, the non-transitory computer readable medium comprising code that, when executed, performs a method comprising:
providing a passive path and an active path for a host to access data of a logical device,
wherein a source data storage system includes a source device and a target data storage system includes a target device and the host recognizes the passive path and the active path as paths to the logical device, the passive path is between the host and the source data storage system, and the active path is between the host and the target data storage system, the active path being used in connection with proxying at least some requests which are requests to perform I/O (input/output) operations directed to the logical device and which are received at the target data storage system from the host, wherein said at least some requests are proxied through the target data storage system to the source data storage system while migrating data for the logical device from the source device to the target device; and
performing said migrating to migrate data for the logical device from the source device to the target device, wherein said migrating is controlled by a migration module executing on the target data storage system that copies data from the source device to the target device and wherein during said migrating, I/O operations from the host directed to said logical device are sent over said active path to the target data storage system, wherein said target data storage system is included in a data storage federation and the source data storage system is not included in the data storage federation, the data storage federation including a plurality of data storage systems using at least one federation-wide namespace wherein each identifier in said one federation-wide namespace is unique across the data storage federation.

* * * * *